United States Patent
Toudji et al.

(10) Patent No.: US 12,039,149 B2
(45) Date of Patent: Jul. 16, 2024

(54) USER INTERFACE SUGGESTIONS FOR ELECTRONIC DEVICES

(71) Applicant: Apple Inc., Cupertino, CA (US)

(72) Inventors: Sofiane Toudji, San Francisco, CA (US); Daniel Li, San Francisco, CA (US); Erik M. Berget, San Francisco, CA (US); Mateusz K. Rajca, Menlo Park, CA (US); Rishab Mehra, London (GB); Surabhi Gupta, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/095,985

(22) Filed: Jan. 11, 2023

(65) Prior Publication Data

US 2023/0367451 A1 Nov. 16, 2023

Related U.S. Application Data

(60) Provisional application No. 63/340,408, filed on May 10, 2022.

(51) Int. Cl.
*G06F 3/0482* (2013.01)
(52) U.S. Cl.
CPC .................. *G06F 3/0482* (2013.01)
(58) Field of Classification Search
CPC ................................................ G06F 3/048–05
See application file for complete search history.

(56) References Cited

U.S. PATENT DOCUMENTS

| | | | |
|---|---|---|---|
| 8,515,499 B1 * | 8/2013 | Stekkelpak | G06F 1/3203 455/574 |
| 11,131,967 B2 | 9/2021 | Guzman et al. | |
| 2008/0244527 A1 * | 10/2008 | Chang | G06N 5/02 717/127 |
| 2010/0228751 A1 * | 9/2010 | Oh | G06F 16/58 707/E17.03 |
| 2010/0303286 A1 * | 12/2010 | Kim | H04L 67/52 382/190 |
| 2012/0140255 A1 * | 6/2012 | Tanaka | H04N 1/00938 358/1.13 |
| 2012/0185803 A1 * | 7/2012 | Wang | G06F 3/04817 715/847 |
| 2013/0148864 A1 * | 6/2013 | Dolson | G06V 20/30 382/190 |
| 2013/0187753 A1 * | 7/2013 | Chiriyankandath | H04M 1/72454 340/5.51 |
| 2014/0267383 A1 * | 9/2014 | Javidan | G06F 3/04845 345/619 |
| 2014/0282047 A1 * | 9/2014 | Lee | G06F 3/0488 715/741 |

(Continued)

*Primary Examiner* — Daniel Rodriguez
(74) *Attorney, Agent, or Firm* — BAKERHOSTETLER

(57) ABSTRACT

Aspects of the subject technology provide for suggested home screens and/or lock screens of an electronic device. The suggested home screens and/or lock screens can include suggested backgrounds, user interface elements, colors, styles, photos, and the like, and can be generated and/or suggested for a user of an electronic device based on activity history information for the user and/or the electronic device. In one or more implementations, the home screens and/or lock screens may be generated and/or suggested specifically for various operational modes of the electronic device.

30 Claims, 11 Drawing Sheets

(56) References Cited

U.S. PATENT DOCUMENTS

| | | | |
|---|---|---|---|
| 2014/0331146 A1* | 11/2014 | Ronkainen | G06F 3/04883 715/810 |
| 2014/0368450 A1* | 12/2014 | Takiguchi | G06T 1/20 345/173 |
| 2015/0002431 A1* | 1/2015 | Lee | G06F 3/0488 345/173 |
| 2015/0067555 A1* | 3/2015 | Joo | G06F 3/04842 715/765 |
| 2015/0161169 A1* | 6/2015 | Fry | G06F 16/58 707/738 |
| 2015/0169183 A1* | 6/2015 | Son | G06F 3/04817 715/765 |
| 2015/0261423 A1* | 9/2015 | Beaumont | G06F 9/451 715/778 |
| 2015/0293686 A1* | 10/2015 | Lee | G06F 3/0488 715/778 |
| 2015/0347437 A1* | 12/2015 | Marti | G06Q 30/02 707/731 |
| 2016/0005204 A1* | 1/2016 | Zeng | G06T 11/60 715/202 |
| 2016/0062635 A1* | 3/2016 | Feit | G06F 9/485 715/765 |
| 2016/0164757 A1* | 6/2016 | Pape | G06F 11/3082 709/224 |
| 2016/0357406 A1* | 12/2016 | Lee | G06V 10/17 |
| 2016/0360336 A1* | 12/2016 | Gross | H04W 4/025 |
| 2017/0090732 A1* | 3/2017 | Dong | G06Q 30/00 |
| 2017/0099602 A1* | 4/2017 | Joo | G06F 21/32 |
| 2017/0115998 A1* | 4/2017 | Fang | H04M 1/724 |
| 2017/0161047 A1* | 6/2017 | Jeon | G06F 8/61 |
| 2018/0341380 A1* | 11/2018 | Lu | G06F 3/0484 |
| 2018/0348976 A1* | 12/2018 | Bai | G06F 3/0484 |
| 2018/0373342 A1* | 12/2018 | Bai | H04M 1/72427 |
| 2019/0197364 A1* | 6/2019 | Cheng | G06F 16/113 |
| 2020/0272653 A1* | 8/2020 | Lee | G06V 10/82 |
| 2021/0407161 A1* | 12/2021 | Fukushima | G06F 3/04845 |
| 2022/0058713 A1* | 2/2022 | Correa | G06N 7/01 |
| 2023/0031999 A1* | 2/2023 | Lim | G06V 10/7715 |
| 2023/0067599 A1* | 3/2023 | Zhang | G06F 9/451 |

* cited by examiner

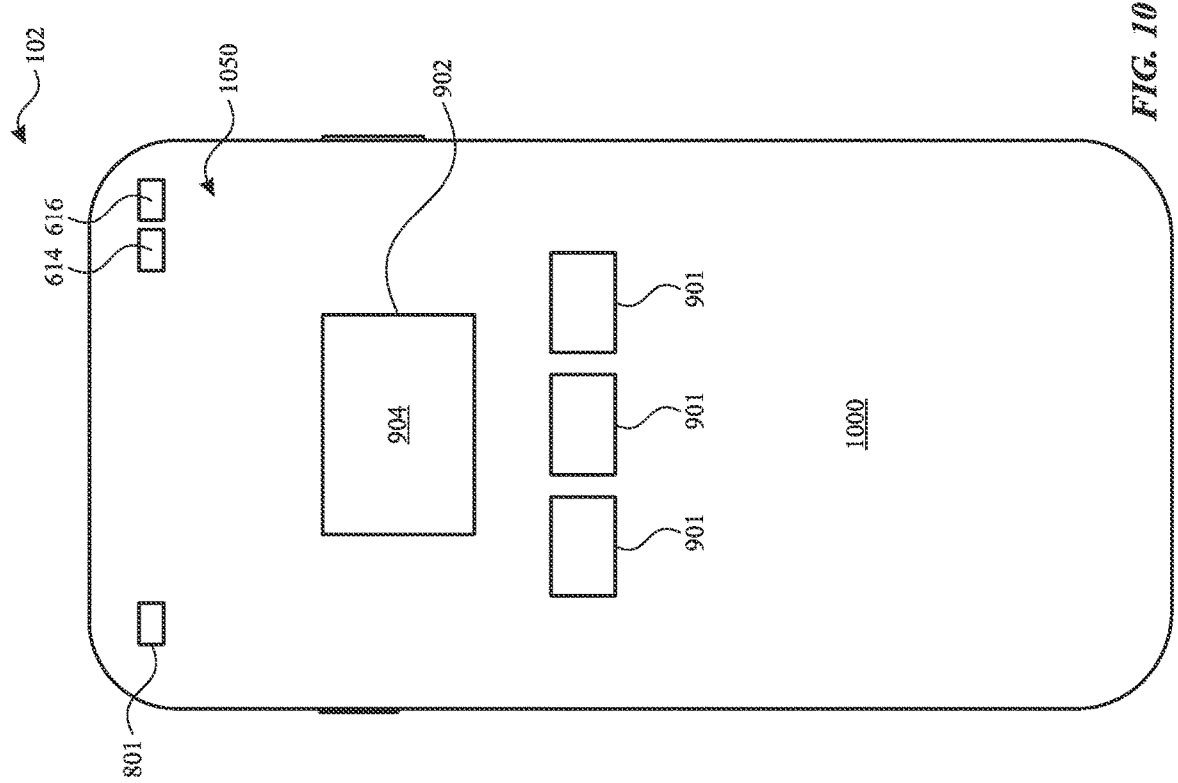
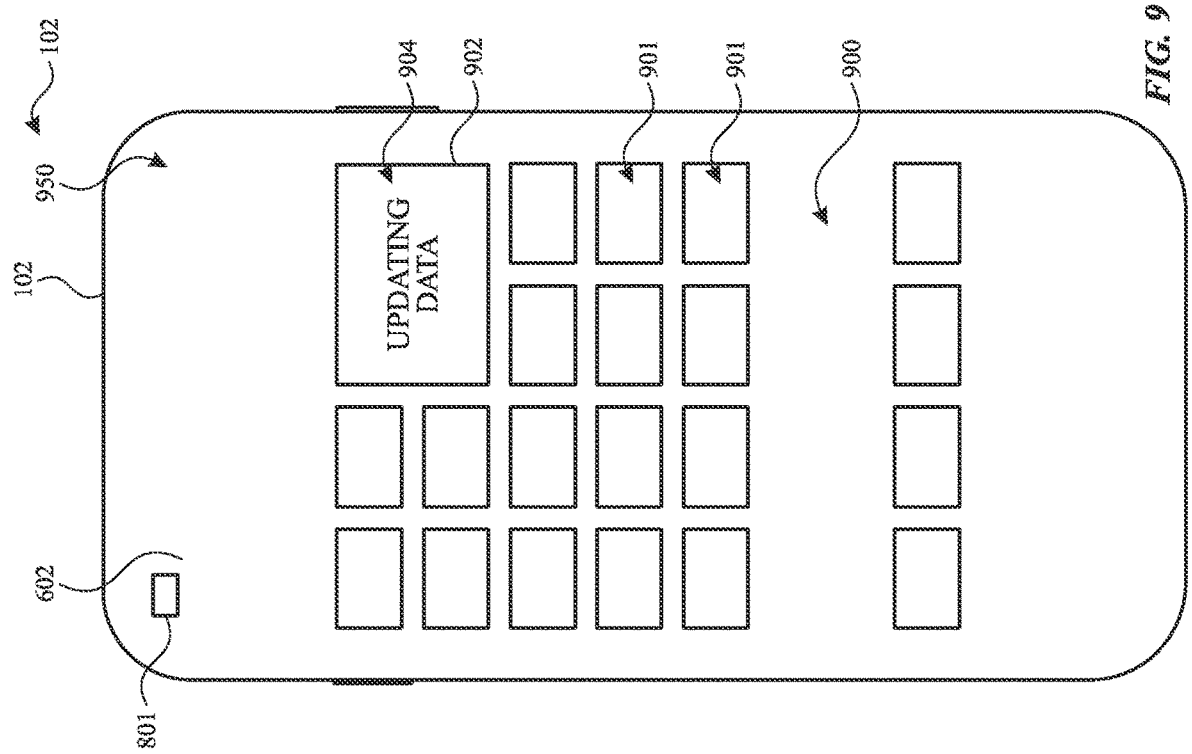

USER INTERFACE SUGGESTIONS FOR ELECTRONIC DEVICES

CROSS REFERENCE TO RELATED APPLICATIONS

This application claims the benefit of priority to U.S. Provisional Patent Application No. 63/340,408, entitled, "USER INTERFACE SUGGESTIONS FOR ELECTRONIC DEVICES", filed on May 10, 2022, the disclosure of which is hereby incorporated herein in its entirety.

TECHNICAL FIELD

The present description relates generally to electronic devices, including, for example, user interface suggestions for electronic devices.

BACKGROUND

Electronic devices typically provide lock screens that are displayed when the display of the electronic device is active and the electronic device has not yet received authentication information required by the device to allow access to the device's functionality. The lock screen is typically a non-functional screen other than providing an input option to provide authentication. In some devices, a clock is provided on the lock screen. Once authentication is provided, the electronic device often displays a home screen. The home screen typically displays application icons displayed over a background image.

BRIEF DESCRIPTION OF THE DRAWINGS

Certain features of the subject technology are set forth in the appended claims. However, for purpose of explanation, several embodiments of the subject technology are set forth in the following figures.

FIG. 9 illustrates an example electronic device displaying a home screen for a normal operational mode in accordance with one or more implementations.

FIG. 10 illustrates an example electronic device displaying a home screen for another operational mode in accordance with one or more implementations.

DETAILED DESCRIPTION

Figure 1:
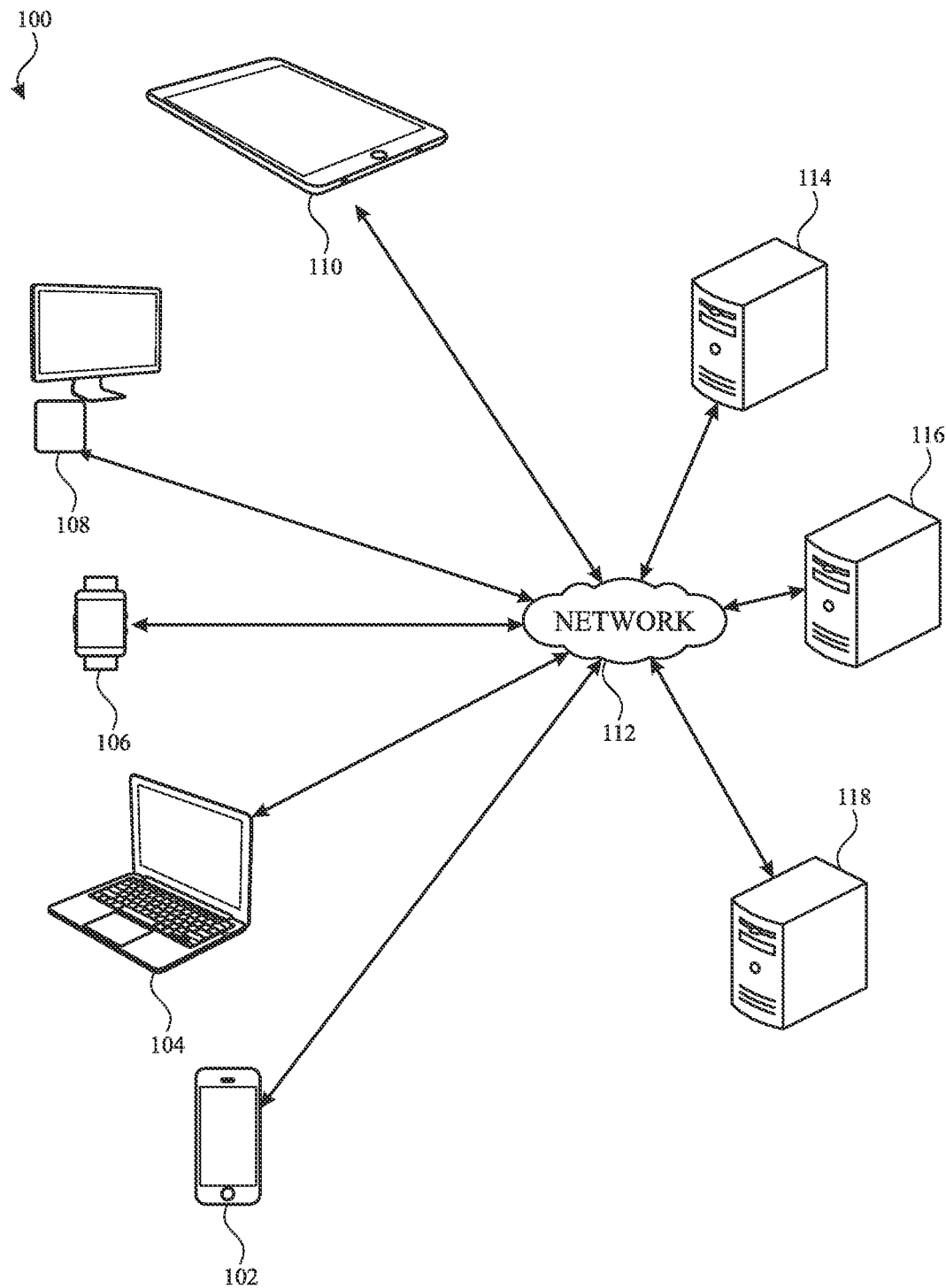
FIG. 1 illustrates an example network environment in which aspects of the subject technology may be implemented, in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An electronic device may have a lock screen that is displayed following a lock event in which access to the electronic device is restricted or entirely prevented. The lock screen may be displayed until authentication information is received from an authorized user of the electronic device. In some cases, a lock screen may continue to be displayed after the authentication information is received, and until a user interaction is received to cause navigation to another screen, such as a home screen.

A typical lock screen of an electronic device provides an authentication input mechanism and may include a non-interactive display of publicly available information, such as a time, or a date. In some devices, functional elements that do not provide access to user-specific or application-specific data may be provided on the lock screen. For example, access to a flashlight functionality or a camera functionality may be provided from the lock screen without requiring user authentication.

In accordance with aspects of the subject technology, an electronic device may include one or more system processes that facilitate display of application-specific updates in, for example, a user interface element, a complication, a widget, or any other user interface element on the lock screen of the electronic device. In one or more implementations, in order to provide these application-specific updates while the electronic device is locked, without exposing user-specific information to an application that is to be restricted from receiving such information in the locked state of the electronic device, the one or more system processes manage the updates without operation of the underlying application to which the updates relate. In various implementations, the application-specific updates may include updates using previously stored update data (e.g., data stored in advance for display at future times), and/or may include live updates in which data for the updates is received substantially at, or just before, the update is displayed and/or in which the live update to the data triggers an update to the displayed user interface element.

With the addition of such user interface elements on the lock screen of an electronic device, the number of possible arrangements of a lock screen grows rapidly, due to the various possible permutations of lock screen backgrounds, publicly available information, application-agnostic user interface elements, and application-specific user interface elements. Further, electronic devices can be configured to operate in various operational modes, such as a work mode, a workout or fitness mode, a home mode, a personal model, or a do not disturb mode (as examples). In one or more implementations, lock screens can be customized for each operational mode, further increasing the various possible options for arrangements, layouts, colors, user interface element sets, etc. of a lock screen.

When, for example, an electronic device receives authentication information for an authorized user and an interaction that navigates from the lock screen, a home screen for the electronic device may be displayed. In contrast with the lock screen, the home screen provides a portal for access to substantially all of the device's functionality. Typically, a home screen includes various application icons that are selectable to access various applications that are installed on the electronic device. Application-specific user interface elements can also be included in the home screen.

Various customized home screens can also be configured for various operational modes of an electronic device. With the addition of application-specific user interface elements to the home screen, and with the ability to configure home screens for each of various operational modes, the number of possible arrangements of the home screens also grows rapidly.

Aspects of the subject technology provide for suggestions of lock screen and/or home screen configurations for an electronic device. A suggested lock screen or home screen configuration can include a background color or wallpaper, a category (e.g., a photos category, an emojis category, an astronomy category, a fitness category, an astronomy category, a holiday category, a cultural celebration/awareness category (e.g., pride month, black history month, diversity awareness month, etc.), a seasonal category, etc.), a layout, static content (e.g., one or more images or photos), and/or one or more user interface elements (e.g., widgets, complications, or any other user interface element configured to display dynamically updating data from an application while an full user interface of the application is inactive and/or while the application itself is inactive).

The contents of each lock screen or home screen may be determined based on user-specific, device-specific, and/or global heuristics data, such as photo content and/or activity, emoji usage, application usage, social media activity, calendar data, web-based activity, physical color(s) associated with the device, seasonal data, location data, data associated with another device of a user of the electronic device, etc. The one or more user interface elements suggested for a given lock screen or home screen can be suggested based on the user-specific, device-specific, and/or global heuristics data and/or based on other content of the package, such as a category of the lock screen or home screen. The content of a lock screen or home screen, including the one or more user interface elements, can also be based on an operational mode of an electronic device, and for lock screens or home screens to be displayed by the device when the device is in that operational mode.

FIG. 1 illustrates an example network environment in which a system for providing suggested home and lock screens may be implemented, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104, 106, 108 and 110 (also referred to herein collectively as "the electronic devices 102-110"), a server 114 (e.g., an application store server or other server), a server 116 (e.g., a push notification server or other server), and a server 118 (e.g., a cloud storage server or other server), and a network 112. Server 114, server 116, and server 118 may be referred to hereinafter collectively as "the servers 114-118". The network 112 may communicatively (directly or indirectly) couple, for example, any two or more of the electronic devices 102-110 and the servers 114-118. In one or more implementations, the network 112 may be an interconnected network of devices that may include, and/or may be communicatively coupled to, the Internet. In one or more implementations, the network 112 may correspond to a local area network (e.g., a Wi-Fi network) connecting one or more of the electronic devices 102-110. For explanatory purposes, the network environment 100 is illustrated in FIG. 1 as including electronic devices 102-110 and servers 114-118; however, the network environment 100 may include any number of electronic devices and any number of servers.

One or more of the electronic devices 102-110 may be, for example, a portable computing device such as a laptop computer, a smartphone, a smart speaker, a digital media player, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 104 is depicted as a laptop computer, the electronic device 106 is depicted as a smartwatch, and the electronic device 110 is depicted as a tablet. By way of example, the electronic device 108 is depicted as a digital media player (e.g., configured to receive digital data such as music and/or video and stream it to a television or other video display). In one or more implementations, the electronic device 108 may be integrated into the display device.

One or more of the electronic devices 102-110 may be configured to communicate or otherwise interact with one or more of the servers 114-118. Each of the electronic devices 102-110 may be, and/or may include all or part of, the device discussed below with respect to FIG. 2, and/or the electronic system discussed below with respect to FIG. 15.

In one or more implementations, the server 114 may be configured to provide applications for storage and execution on electronic devices 102-110. The electronic devices 102-110 may periodically query the server 114 for updated applications. Updates from server 114 may also be pushed to electronic devices 102-110. In one or more implementations, the server 116 may be configured to receive notifications (e.g., push notifications) for third party applications installed on the electronic devices 102-110, which may be pushed to electronic devices 102-110 when compliant with an update policy. In one or more implementations, the server 116 may provide live data updates to the electronic devices 102-110 for display in one or more user interface elements of a lock screen or a home screen. In one or more implementations, the server 118 may be configured to store data (e.g., files such as documents and/or photos) associated with user accounts for download on user devices, to share and/or send data to other users, and/or to back-up (e.g., wirelessly) device data.

One or more of the servers 114-118 may be, and/or may include all or part of the electronic system discussed below with respect to FIG. 15. Each of the servers 114-118 may include one or more servers, such as a cloud of servers. For explanatory purposes, a single server is shown and discussed with respect to various operations for each of the servers 114-118. However, these and other operations discussed herein may be performed by one or more servers, and each different operation may be performed by the same or different servers.

In one or more implementations, one or more of the servers 114-118 may generate suggested lock screens and/or suggested home screens for any or all of the electronic devices 102-110, and provide the suggested lock screens and/or suggested home screens to the electronic devices 102-110. In various implementations, suggested lock screens and/or suggested home screens generated by the servers 114-118 may be generated specifically for a particular one of the electronic devices 102 based on activity history information for that device, or may be general suggested lock screens and/or home screens that can be locally customized and/or curated at each of the electronic devices 102-110. In one or more implementations, generating a suggested lock screen and/or a suggested home screen may include providing (e.g., at one or more of the servers 114-118 and/or at one or more of the electronic devices 102-110) activity history information for an electronic device to a machine learning model that is trained to generate a suggested lock screen and/or a suggested home screen from the activity history information, and obtaining the suggested lock screen and/or suggested home screen as an output of the machine learning model.

Figure 2:
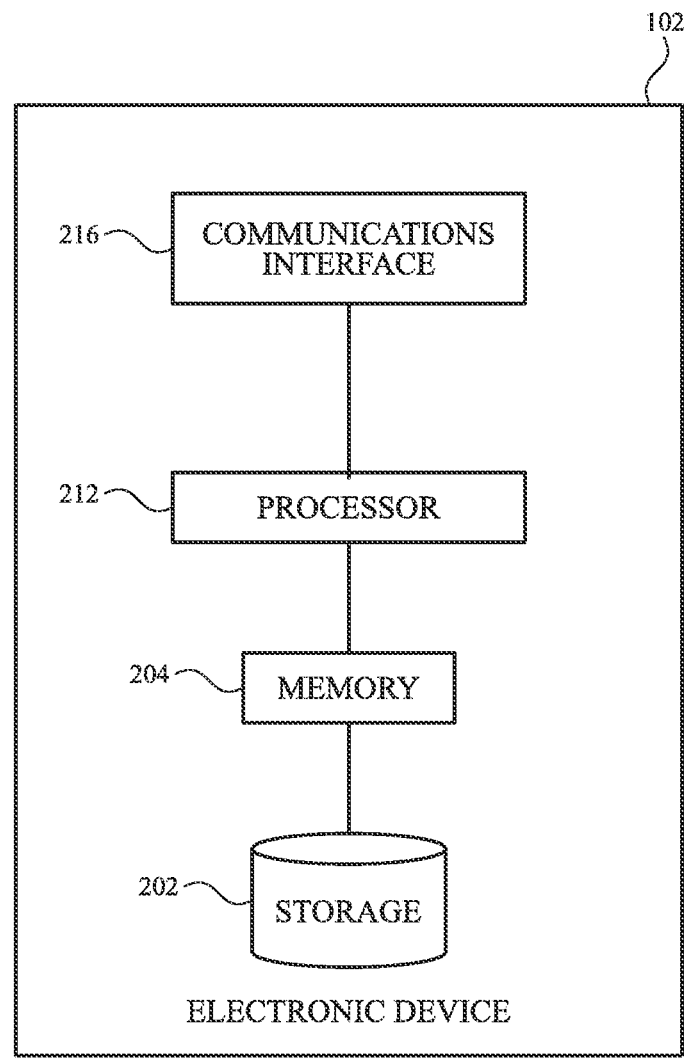
FIG. 2 illustrates a block diagram of an example electronic device that may implement aspects of the subject technology, in accordance with one or more implementations.

FIG. 2 illustrates a block diagram of an example electronic device that may implement systems and methods for suggestions of home screens and/or lock screens, in accordance with one or more implementations. For explanatory purposes, FIG. 2 is primarily described herein with reference to the electronic device 102 of FIG. 1. However, FIG. 2 may correspond to any of the electronic devices 102-110 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a storage 202, a memory 204, a processor 212, and a communication interface 216. The storage 202 may correspond to a first type of memory, such as a non-volatile memory, including flash storage such as NAND flash and/or magnetic storage. The memory 204 may correspond to a second type of memory, such as a volatile memory, including dynamic random-access memory (DRAM). The memory 204 may include suitable logic, circuitry, and/or code that enable storage of various types of information such as received data, generated data, code, and/or configuration information.

The processor 212 may include suitable logic, circuitry, and/or code that enable processing data and/or controlling operations of the electronic device 102. In this regard, the processor 212 may be enabled to provide control signals to various other components of the electronic device 102. The processor 212 may also control transfers of data between various portions of the electronic device 102, including storage 202 and memory 204. Additionally, the processor 212 may enable implementation of an operating system or otherwise execute code to manage operations of the electronic device 102. The processor 212 may include general purpose processors, graphics processing units (GPUs), and/or specialized processors.

In one or more implementations, the memory 204 may store one or more background processes for generating, curating, and/or providing suggested lock screens and/or suggested home screens. As described below with respect to FIG. 3, the background processes may also maintain activity history information, such as application usage history, application classification metadata, user-specific activity history data, device-specific activity history data, and/or global heuristics data. The activity history data may also include photo content and/or activity, emoji usage, application usage, social media activity, calendar data, web-based activity, physical color(s) associated with the device, seasonal data, location data, data associated with another device of a user of the electronic device, etc.

The communication interface 216 may include suitable logic, circuitry, and/or code that enables wired or wireless communication, such as between any of the electronic devices 102-110 and one of more of the servers 114-118 over the network 112. The communication interface 216 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 212, the storage 202, the memory 204, the communication interface 216, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
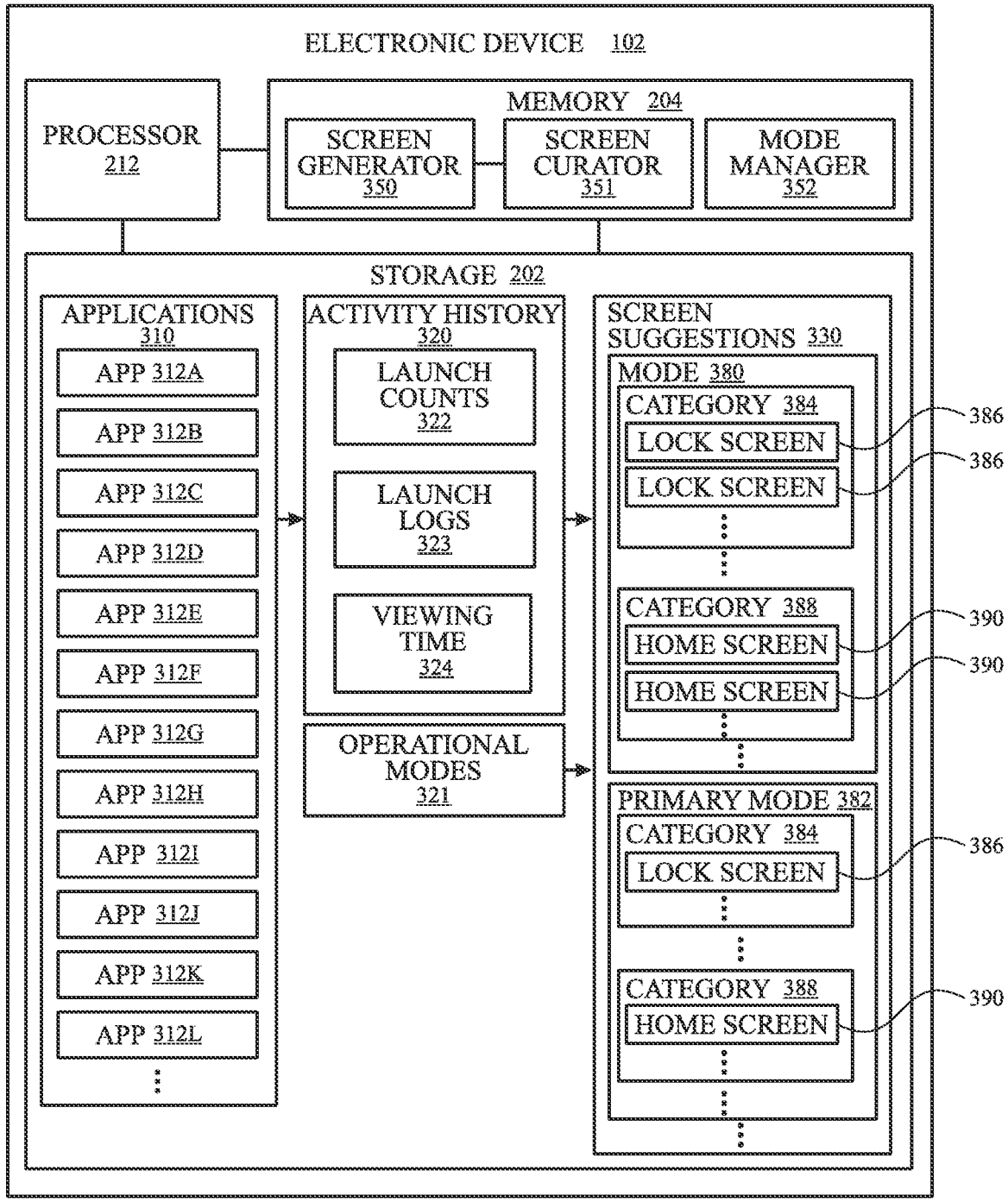
FIG. 3 illustrates a block diagram showing additional features of an example electronic device that may implement one or more aspects of the subject technology, in accordance with one or more implementations.

FIG. 3 illustrates a block diagram of an electronic device 102 for executing background processes and storing applications 310, activity history 320, and screen suggestions 330, in accordance with one or more implementations. As shown in the example of FIG. 3, electronic device 102 may include storage 202, memory 204, and a processor 212. Storage 202 may store the applications 310, activity history 320, operational mode configurations 321, and screen suggestions 330. In the example of FIG. 3, applications 310 may include applications 312A through 312L.

In the example of FIG. 3, activity history 320 may include launch counts 322, launch logs 323, and viewing time 324. Activity history 320 may also include activity history information such as user-specific activity history data, device-specific activity history data, and/or global heuristics data. The activity history 320 may also include photo content and/or activity, emoji usage, application usage, social media activity, calendar data, web-based activity, physical color(s) associated with the device, seasonal data, location data, data associated with another device of a user of the electronic device, etc. As discussed in further detail hereinafter, the activity history 320 may be used by the electronic device 102 and/or a server such as server 114, server 116, and/or server 118 to generate suggested lock screens and/or suggested home screens for the electronic device 102, and/or to select the suggested lock screens and/or suggested home screens for display and selection by a user of the electronic device 102. As one initial example, the activity history may indicate that the user of the electronic device often communicates with a contact for which a contact photo is stored at the electronic device, and a suggested home screen or a suggested lock screen may be generated that includes another photo of that contact (e.g., identified using the contact photo) as a background. As another initial example, the activity history may indicate that the user of the electronic device often uses a smiley-face emoji in electronic messages sent from the electronic device, and a suggested home screen or a suggested lock screen may be generated that includes a larger image of the smiley-face emoji as a background. As another initial example, the activity history may indicate that the user of the electronic device often uses a browser application of the electronic device to view web pages and/or other web-based content associated with an upcoming event, such as a concert or a cultural festival, and a suggested home screen or a suggested lock screen may be generated that includes an image associated with the concert or cultural festival, a user interface element for a weather application that displays weather information for a location of the concert or cultural festival, and/or a user interface element for a ticket-seller application that displays ticket prices and/or sales information for the concert or cultural festival. In this way, the activity history 320 can be used, with permission and authorization by the user of the electronic device, to generate suggested lock screens and/or suggested home screens that include content that is relevant to the user. Further details and examples of how the activity history 320 can be used to generate suggested lock screens and/or suggested homes screens are described hereinafter in connection with, for example, FIGS. 4-14. The activity history 320 may include information indicating user and/or device activity at the electronic device 102 and/or user and/or device activity at one or more other electronic device, such as an electronic device 106 associated with a same account as the electronic device 102.

Memory 204 may, for example, store code for a screen generator 350, a screen curator 351, and a mode manager 352. In one or more implementations, the screen generator 350 may be configured to generate suggested home screens and/or suggested lock screens for the electronic device 102 based on the activity history 320 and/or the operational mode configurations 321. In one or more implementations, the screen curator 351 may be configured to select a subset of previously generated suggested home screens and/or suggested lock screens from a previously generated set of suggested home screens and/or suggested lock screens (e.g., generated by the screen generator 350 at the electronic device 102 and/or generated at a remote device or server, such as one or more of the servers 114-118). In one or more implementations, the screen curator 351 may provide the selected subset for display. Once displayed, a user of the electronic device 102 may select one of the displayed suggested home screens as a home screen for the electronic device 102 and/or may select one of the displayed suggested lock screens as a lock screen for the electronic device 102. In one or more other implementations, the screen generator 350 may also, or alternatively, provide one or more suggested home screens and/or one or more suggested lock screens for display without curation by the screen curator 351.

In one or more implementations, the mode manager 352 may facilitate operation of the electronic device in one or more operational modes according to the operational mode configurations 321. For example, when the electronic device 102 is locked and in an operational mode, the mode manager 352 may surface a selected one of the lock screens 386 (from the screen suggestions 330) for that operational mode. As another example, when the electronic device 102 is unlocked and in an operational mode, the mode manager 352 may surface a selected one of the suggested home screens 390 (from the screen suggestions 330) for that operational mode. In one or more implementations, the mode manager 352 may switch the electronic device 102 between operations modes automatically (e.g., according to a user-defined schedule, and/or according to learned behavior of the user or other information that indicates a trigger for an operational mode). In one or more implementations, the mode manager 352 may perform other operations based on the operational mode configurations 321, such as managing which notifications are output from the electronic device in a given operational mode.

As shown in FIG. 3, a number of applications 310 including applications 312A through 312L may be installed on electronic device 102. The applications 310 may, for example, have been previously downloaded from an application store server. In some implementations, the applications 310 may also include applications downloaded from an enterprise application distribution server that is separate from an application store server. For example, the enterprise application distribution server may only be accessible from a corporate intranet or other private network separate from network 112.

When a user launches and spends time interacting with one or more of the applications 310, the activity may be tracked locally at the electronic device 102 (after receiving prior permission from the user of the electronic device) and recorded in the activity history 320. For example, launch counts 322 may track a total number of application launches and wakes for each of applications 310, launch logs 323 may track dates and times of each launch and wake, and viewing time 324 may track total time spent interacting with each of applications 310. In some implementations, one or more portions of the activity history 320 may be derived from other data in activity history 320. For example, launch counts 322 and viewing time 324 may be derived from launch logs 323. As described herein, the activity history 320 may include additional information indicating the history of the electronic device 102 and/or the user of the electronic device 102, obtained after obtaining explicit permission from the user opting into the local usage of activity history information.

As illustrated in FIG. 3, in one or more implementations, storage 202 may include memory that stores installed applications 310, the activity history 320, the operational mode configurations 321, and a set of screen suggestions 330. As shown, the screen suggestions 330 may include one or more categories 384 of suggested lock screens 386 and/or one or more categories 388 of suggested home screens 390. As shown, the screen suggestions 330 may include categories 384 of suggested lock screens 386 for each of several operational modes of the electronic device 102 (e.g., an operational mode 380, such as a fitness mode, a workout mode, a sleep mode, or a home mode, and a primary mode 382 or normal mode), and categories 388 of suggested home screens 390 for each of the several operational modes of the electronic device 102 (e.g., an operational mode 380, such as a fitness mode, a workout mode, a sleep mode, or a home mode, and a primary mode 382 or normal mode).

Figure 4:
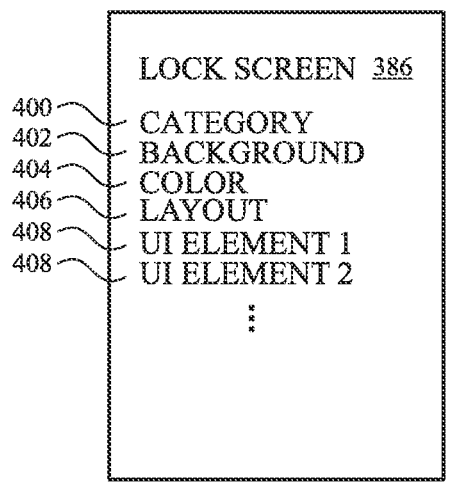
FIG. 4 illustrates example features of a suggested lock screen for an electronic device, in accordance with one or more implementations.

FIG. 4 illustrates an example of the content of a suggested lock screen 386, in accordance with one or more implementations. As shown in the example of FIG. 4, a suggested lock screen 386 may include a category 400, a background 402, one or more colors such as color 404, a layout 406, and/or one or more user interface elements 408. The category 400 may be a photos category, an emojis category, an astronomy category, a fitness category, a cultural celebration/awareness category, a seasonal category, or other suitable category. In one or more implementations, the category 400 of a suggested lock screen 386 may be used to group the suggested lock screen into the categories 384 of FIG. 3.

The background 402 may include a photo, a color, a pattern, an emoji image, or other background content or art that is configured to occupy substantially the entire displayable area of the display of an electronic device, and to have portions that are covered by foreground display elements. The color 404 may be a color of or within the background 402, or a theme color for the lock screen. The color 404 may be a single color, or may include multiple colors (e.g., in a color palate for the lock screen 386). The color may be pre-set for a given suggested lock screen 386, or may be determined by the electronic device 102 (or a remote device or server) based on another element of the suggested lock screen 386 (e.g., based on the background and/or an image) and/or based on a physical aspect of the electronic device 102 (e.g., a color of a physical component, such as the housing 600 or a case. In one or more implementations in which a suggested lock screen includes a photo or a portion thereof (e.g., as a background 402 or as part of a background 402), the photo may be included in the suggested lock screen based, in part, on a determination (e.g., by the screen generator 350 and/or by a remote device or server) that the photo is a suitable background photo. For example, a machine learning model (e.g., implemented as part of the screen generator 350, elsewhere at the electronic device 102, or at a remote device or server) may be trained to receive photos as inputs, and to output a tag or label indicating whether the photo is suitable for a background photo. The label or tag may be a binary label indicating that the photo is suitable for a background photo or not suitable for a background photo, or may be a score or probability that the photo is suitable for a background photo. In one or more implementations, a photo may be determined to be suitable for a background photo if the photo is clear, in focus, and/or has regions of blank or smoothly changing content that may not be distracting to a user viewing UI elements 408 and/or application icons 410 overlaid on top of the photo. Determining whether the photo is suitable for a background photo for any lock screen or any home screen may be separate from and/or additional to determining whether the photo is relevant for one particular lock screen or home screen (which may be determined based on the content of the photo, an activity history of the photo, a category of the lock screen or home screen, an operational mode, and/or other information as described herein). In various implementations, determining whether a photo is suitable for a background photo and determining whether a photo is relevant for a particular suggested lock screen or suggested home screen may be performed in separate operations (e.g., by separate machine learning models at separate times or in parallel) or in a joint operation (e.g., by a single machine learning model that has been trained to identify photos that are both suitable for a background photo and relevant to a particular category of lock screen or home screen).

The user interface elements 408 may each include a user interface (UI) view of an underlying one of the applications 312A-312L of FIG. 3. The UI view corresponding to an application may be a dynamic display element that includes a subset of the information and/or functionality of a full UI of the application. Any or all of the applications 312A-312L may have one or more associated user interface elements 408. A user interface element 408, when displayed on a lock screen or a home screen of an electronic device may dynamically display application-specific information on an ongoing basis, without requiring operation of the underlying application. As examples, a system process of the electronic device 102 may receive pre-rendered views of a user interface element from an application at a time when the application is active, and then later display the pre-rendered views of the user interface element at pre-determined times while the underling application is inactive. As another example, the system process may receive updating data for a user interface element from a server associated with the application to which a user interface element 408 corresponds, and update the data in the user interface element 408 without interacting with the underlying application. User interface elements 408 may be non-functional user interface elements that display information (e.g., sports scores, calendar events, tides, or the like) associated with an application without including a user-interactive component, and/or the user interface elements 408 may include functional user interface elements that can be, for example, selected by a user of the electronic device to launch the full user interface of the underlying application for that user interface element 408.

Figure 5:
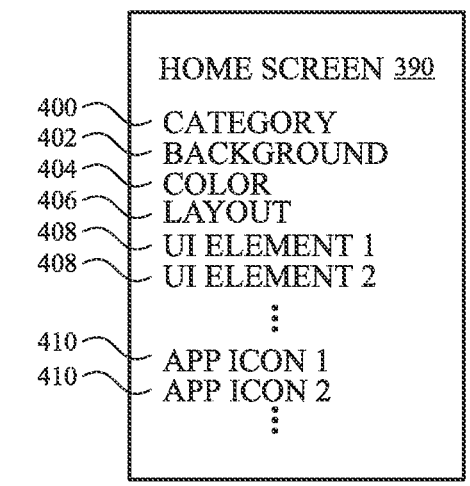
FIG. 5 illustrates example features of a suggested home screen for an electronic device, in accordance with one or more implementations.

FIG. 5 illustrates an example of the content of a suggested home screen 390, in accordance with one or more implementations. As shown in the example of FIG. 5, a suggested home screen 390 may include a category 400, a background 402, one or more colors such as color 404, a layout 406, and/or one or more user interface elements 408. In contrast with the suggested lock screen 386 of FIG. 4, the suggested home screen 390 also includes one or more application icons 410. The application icons 410 may include, for example, a static image indicative of an application and may be selectable to launch a corresponding application. The application icons 410 may not include active or updating content.

Figure 6:
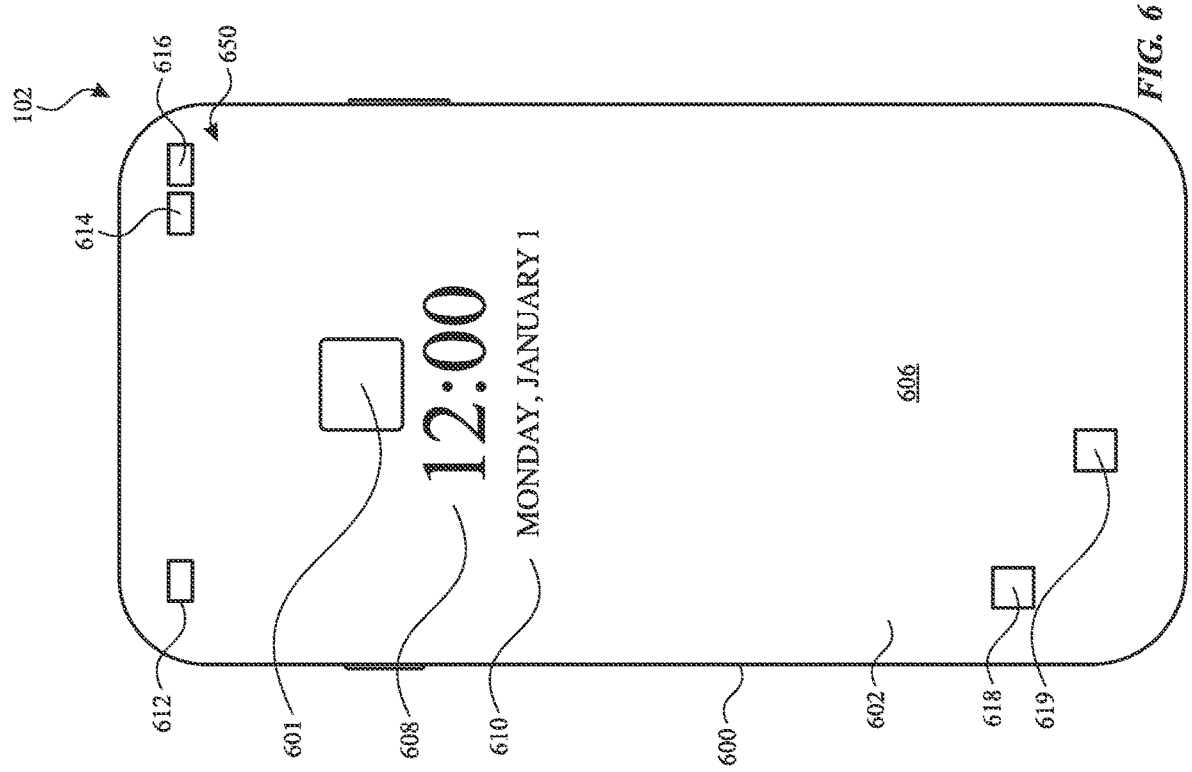
FIG. 6 illustrates an example electronic device displaying a lock screen in accordance with one or more implementations.

FIG. 6 illustrates an example in which the electronic device 102 displays a lock screen 650, while the electronic device 102 is a locked state. For example, the electronic device 102 may include a housing 600 (e.g., and/or a cover or a case, such as an external case that is attached to the electronic device 102, such as for decoration and/or protection of the electronic device), and a display 602 that displays the lock screen 650. In the example of FIG. 6, the electronic device 102 the lock screen 650 includes an unlock mechanism 619. The unlock mechanism 619 may be selectable by a user of the electronic device 102 to initiate an unlock procedure (e.g., a procedure in which the user provides authentication information to unlock the electronic device). In the example of FIG. 6, the lock screen 650 also includes a lock indicator 601 indicating that the electronic device is locked. In one or more implementations, when authentication information is received by the electronic device 102, and before the user provides an additional interaction to navigate away from the lock screen 650 (e.g., to a home screen, such as suggested home screen 390), the lock indicator 601 may indicate that the electronic device 102 is unlocked for a period of time while the lock screen 650 continues to be displayed.

In the example of FIG. 6, the lock screen 650 also includes a carrier indicator 612, a signal strength indicator 614, and a battery indicator 616. As shown, the lock screen 650 may also include a background 606 (e.g., an implementation of the background 402 of FIG. 4), a user interface element 618 (e.g., an implementation of a user interface element 408 of FIG. 4 implemented as a small user interface element), and may include publicly available data, such as a clock 608 and a date 610. In one or more implementations, the electronic device 102 may include one or more sensing components (e.g., a camera and/or an infrared sensor or depth sensor) that can be used for obtaining biometric authentication information from a user of the electronic device. In other examples, the electronic device 102 may obtain biometric or non-biometric (e.g., passcode) authorization information from other sensors and/or input components, such as a touch screen or a keyboard of the electronic device 102.

Figure 7:
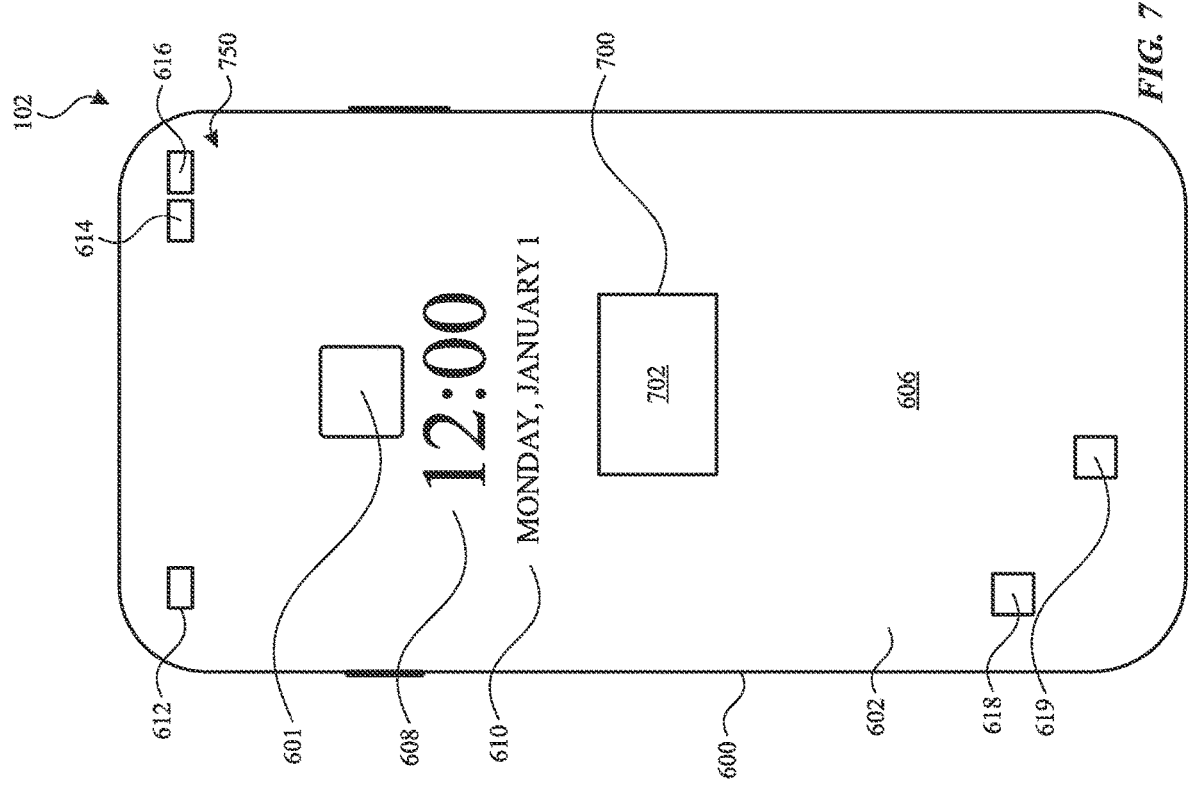
FIG. 7 illustrates another example electronic device displaying a lock screen in accordance with one or more implementations.

FIG. 7 illustrates an example in which the electronic device 102 displays another example lock screen 750. In the example of FIG. 7, the lock screen 750 includes all of the elements of the lock screen 650 of FIG. 6, and includes a user interface element 700. As shown, the user interface element 700 (e.g., another implementation of a user interface element 408 of FIG. 4) may be a large user interface element (e.g., also referred to herein as a widget or a complication) that includes updating data 702. For example, the updating data 702 may be or include dynamically updated data that is rendered by an underlying application for the user interface element 700 in advance of various times at which the updating data 702 is displayed, or may include dynamically updated data provided from a server associated with an underlying application for the user interface element 700 while the underlying application is inactive.

As shown in FIG. 7, the layout of the lock screen 750 is substantially the same as the layout of the lock screen 650, with the exception of the added user interface element 700. In one or more implementations, the data from which the lock screen 750 is generated may include a layout 406 that specifies the sizes and/or locations of the user interface element 618 and/or the user interface element 700 (e.g., relative to each other and/or relative to other elements of the lock screen, such as the clock 608, the date 610, the lock indicator 601, and/or other non-functional elements, such as the carrier indicator 612, the signal strength indicator 614, and the battery indicator 616). In one or more implementations, the housing 600 of the electronic device 102 may have one or more characteristic colors, and/or a cover or case for the electronic device may have one or more characteristic colors.

Figure 8:
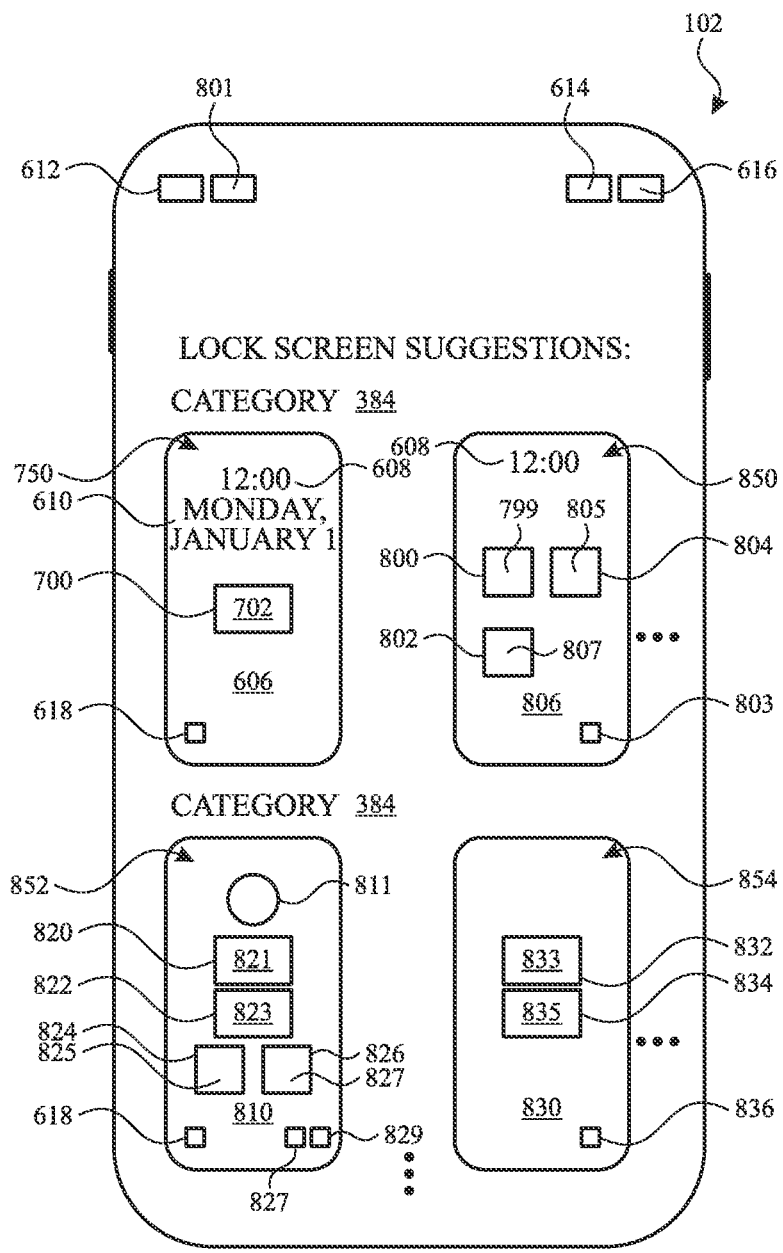
FIG. 8 illustrates an example electronic device providing suggestions of lock screens in accordance with one or more implementations.

The example lock screens of FIGS. 6 and 7 are merely two of many different arrangements of lock screens 386 that can be provided by the electronic device 102. In one or more implementations, the electronic device 102 may provide suggested lock screens for selection by a user of the electronic device. For example, FIG. 8 illustrates the electronic device 102 providing various suggested lock screens (e.g., on the display 602), for selection by the user of the electronic device 102. In the example, of FIG. 8, the suggested lock screens include the lock screen 750 described above in connection with FIG. 7 and having the small user interface element 618 at the lower left and the large user interface element 700 centered within the lock screen and below the date 610. In the example, of FIG. 8, the suggested lock screens also include a suggested lock screen 850, a suggested lock screen 852, and a suggested lock screen 854. In the example of FIG. 8, a current time may also be displayed in clock element 801. For example, the clock element 801 may be substantially smaller and less prominent that the clock 608 that is displayed on a lock screen.

As shown the various suggested lock screens can have various different backgrounds and/or various different numbers, layouts, and/or sizes of user interface elements. In the example of FIG. 8, the suggested lock screen 850 includes a background 806 (e.g., a different background from the background 606 of the suggested lock screen 750, such as a different image or a different color or pattern), three medium-sized user interface elements 800, 802, and 804 laid out in an array, and a small user interface element 803 laid out at the bottom right corner of the screen. In this example, the suggested lock screen 850 includes the clock 608, but does not include the date 610. As shown, the user interface elements 800, 802, and 804 may include respective displays of 1110, 805, and 807.

In the example of FIG. 8, the suggested lock screen 852 includes a background 810 (e.g., a different background from the background 606 of the suggested lock screen 750 and the background 806 of the suggested lock screen 850), two relatively large user interface elements 820 and 822 laid out vertically and centered on the display and each with corresponding updating data 821 and 823, two medium user interface elements 824 and 826 laid out horizontally below the large user interface elements 820 and each with corresponding updating data 825 and 827, the small user interface element 618 laid out at the lower left corner of the display, and two small user interface elements 827 and 829 laid out in a horizontal line at the lower right corner of the display. In this example, the suggested lock screen 852 includes a circular clock 811 with the appearance of an analog clock face, rather than the digital look of the clock 608 of the suggested lock screens 750 and 850.

In the example of FIG. 8, the suggested lock screen 854 includes a background 810 (e.g., a different background from the background 606 of the suggested lock screen 750, the background 806 of the suggested lock screen 850, and/or the background 810 of the suggested lock screen 852), and two relatively large user interface elements 832 and 834 laid out vertically and centered on the display and each with corresponding updating data 833 and 835. In one or more implementations, the electronic device 102 (e.g., the screen generator 350) or a remote device or server may generate the suggested lock screen 750, the suggested lock screen 850, the suggested lock screen 852, the suggested lock screen 854, and/or one or more other suggested lock screens.

In one or more implementations, generating the suggested lock screen 750, the suggested lock screen 850, the suggested lock screen 852, and the suggested lock screen 854 may include determining the layouts for the suggested lock screen 750, and the suggested lock screen 850, the suggested lock screen 852, and the suggested lock screen 854. In one or more implementations, the layouts for the suggested lock screen 750, the suggested lock screen 850, the suggested lock screen 852, and the suggested lock screen 854 may be determined, in part, by the content of the respective backgrounds 606, 806, 810, and 830. For example, the position, size, and/or number of UI elements in a suggested lock screen may be determined, in part, such that certain background features (e.g., a face of a person in a photo in the background of that suggested lock screen, or the eyes or mouth of an emoji of the background of that suggested lock screen) are not blocked by the UI elements. In one or more implementations, multiple suggested lock screens may be generated with UI elements of the same set of underlying applications but with varying sizes of the UI elements (e.g., so that the user can select a preferred layout from among multiple layouts with similar content). In one or more implementations, the layouts of the suggested lock screen 750, the suggested lock screen 850, the suggested lock screen 852, and the suggested lock screen 854 may be determined, in part, based on layout rules, such as rules governing even horizontal and/or vertical spacing, symmetry, minimum or maximum background coverage rules, and/or the like. In one or more implementations, the layout rules may be adjusted based on the activity history 320 and/or other information, such as layouts, crowdedness, and/or UI element sizes that are currently being used or have historically been used at the electronic device 102 and/or one or more other devices associated with a user account of the user of the electronic device 102. In one or more implementations, UI elements that have been identified for a suggested lock screen may be ranked (e.g., ranked by relevance to the user, such as based on the activity history information) and the layout for the suggested lock screen may be determined based, in part, on the ranking. For example, the UI elements 820 and 822 of the suggested lock screen 852 of FIG. 8 may be ranked higher than the UI elements 824 and 826, and may therefore be larger in size than the UI elements 824 and 826. Moreover, the smaller sizes of the UI elements 824 and 826 may allow the suggested lock screen 852 to be generated with the layout in which the UI elements 824 and 826 are laid out horizontally along a common horizontal line. In another example, the UI element 800, the UI element 802, and the UI element 804 of the suggested lock screen 850 may have similar rankings or scores in terms of relevance to the user (e.g., based on the activity history 320, the UI element 800, the UI element 802, and the UI element 804 may be determined to have been accessed with similar or equal frequency at the electronic device 102) and may be laid out in an even distribution with common sizes based on the similar ranking and/or scores. In one or more implementations, the layout of a suggested lock screen such as the suggested lock screen 852 may be determined, in part, based on associations between the UI elements of that suggested lock screen. For example, the UI element 820 and the UI element 822 may be laid out near each other (e.g., and with a common size) based on a common or related application type for the underlying applications of the UI element 820 and the UI element 822, and/or the UI element 824 and the UI element 826 may be laid out near each other (e.g., and with a common size) based on a common or related application type for the underlying applications of the UI element 824 and the UI element 826. In one or more implementations, the layout of a suggested lock screen such as the suggested lock screen 852 may be determined, in part, based on a type of a UI element. For example, the UI element 618 may, in some examples, be a borderless UI element that can be curved or otherwise fit for display at or near a curved corner of the display 602, and may be laid out in the corner of the display for at least that reason in one or more implementations.

In one or more implementations, the suggested lock screen 750, the suggested lock screen 850, the suggested lock screen 852, the suggested lock screen 854, and/or one or more other suggested lock screens can be generated based on the activity history 320, and/or can be selected from a set of suggested lock screens based on the activity history 320. For example, in one or more implementations, the suggested lock screen 750, the suggested lock screen 850, the suggested lock screen 852, and the suggested lock screen 854 (e.g., including the content, color, background, layout, and/or user interface elements thereof) are each generated based on the activity history 320. In one or more other implementations, the suggested lock screen 750, the suggested lock screen 850, the suggested lock screen 852, the suggested lock screen 854 (e.g., including the content, color, background, layout, and/or user interface elements thereof) may be generated based on global activity history for a population of users and/or devices, and may be selected (e.g., by the screen curator 351 of FIG. 3) for display as lock screen suggestions at the electronic device 102. In one or more other implementations, only some of the suggested lock screen 750, the suggested lock screen 850, the suggested lock screen 852, and the suggested lock screen 854 (e.g., including the content, color, background, layout, and/or user interface elements thereof) are generated based on the activity history 320. As discussed herein, some or all of the suggested lock screens may be generated by a screen generator 350 at the electronic device 102, and or some more all of the suggested lock screens may be generated remotely from the electronic device, such as at a server (e.g., the one or more of the servers 114-118 of FIG. 1). In an example in which some or all of the suggested lock screens are generated remotely from the electronic device 102, the electronic device 102 may select a subset of the suggested lock screens for display and selection by a user, based on the activity history 320.

As shown in FIG. 8, the suggested lock screens (e.g., the suggested lock screen 750, the suggested lock screen 850, the suggested lock screen 852, and the suggested lock screen 854) can be displayed in a categorized display with one, two, three, or more than three suggested lock screens in each of several categories 384 of suggested lock screens. In one illustrative example, the two categories 384 shown in FIG. 8 may be a photos category and a fitness category. In this illustrative example, the suggested lock screen 750 and the suggested lock screen 850 may each have a respective background that is, or includes, a photo from a photo library of a user of the electronic device, may include a color palate or scheme that is based on the colors in the respective background photos, may include a layout that facilitates viewability of faces or other objects of interest in the respective background photos, and/or may include user interface elements relating to photos in general (e.g., a photos app user interface element) and/or relating to objects and/or people in the respective background photos (e.g., a messaging user interface element, a social media application, or a mapping application).

In this illustrative example, the suggested lock screen 852 and the suggested lock screen 854 may each have a background that is or includes a respective fitness-related image (e.g., a photo of a user during a workout or captured using a fitness application, or a general photo of an athlete, athletic equipment, etc.), may include a color palate or scheme that is based on the colors in the respective background photos, may include user interface elements relating to fitness and/or workout tracking, and/or may include a layout that facilitates viewability of real-time fitness tracking data.

In one or more implementations, one or more of the categories 384 may be an operational mode category corresponding to an operational mode of the electronic device 102. For example, a category 384 maybe a work mode category, a home mode category, a fitness mode category, or the like. In one or more other implementations, several or all of the categories 384 and/or the suggested lock screens within each of the categories 384 may be generated and/or selected for display in accordance with an operational mode of the electronic device 102. For example, the categories 384, the suggested lock screen 750, the suggested lock screen 850, the suggested lock screen 852, and the suggested lock screen 854 may be displayed when a user of the electronic device 102 is setting up an operational mode for the electronic device 102. As another example, the categories 384, the suggested lock screen 750, the suggested lock screen 850, the suggested lock screen 852, and the suggested lock screen 854 may be displayed under a higher level category of lock screen suggestions for an operational mode of the electronic device 102. In this example, the electronic device 102 may provide multiple operational mode categories, each with one or more sub-categories corresponding to the categories 384 containing one or more suggested lock screens.

Once a user selects one of the suggested lock screens, that lock screen, including the background, and any user interface elements associated therewith, can be displayed on the display 602 of the electronic device 102 following a lock event of the electronic device 102 and until the user of the electronic device 102 provides authentication information to the electronic device 102 for unlocking the electronic device 102, and or provides an input to navigate away from the displayed lock screen.

In this way, a user of the electronic device 102 can be provided with an efficient interface for selecting lock screens (e.g., and associated content, look, layout, and/or functionality) that are relevant to the user, from many (e.g., tens, hundreds, thousands) of possible lock screens available at the electronic device 102.

As discussed herein, the electronic device 102 may also provide suggested home screens for selection by a user. In one or more implementations, the suggested home screens may be suggested by the electronic device 102 for various operational modes of the electronic device 102.

For example, FIG. 9 illustrates a home screen 950 of an electronic device. For example, the home screen 950 maybe a primary home screen of the electronic device 102 that is displayed when the electronic device 102 is in a primary or normal operating mode. As shown in FIG. 9, the home screen 950 may include a background 900, one or more application icons 901, and/or one or more user interface elements, such as user interface element 902 including updating data 904. In various implementations, the updating data 904 may include data stored in advance for display in the user interface element 902 (e.g., predictable data, such as a time, tide information, or the like), and/or may include live updates, such as data received from a corresponding application or a server for update (e.g., unpredictable data, such as a real-time score of a sporting event, or other real-time data). As illustrated in FIG. 9, in contrast with a lock screen, a home screen may not include a lock indicator 601, an unlock mechanism 619, or a date 610, and may provide access to data stored at the electronic device 102, such as application data accessible by launching an application using a corresponding application icon 901.

As shown in the example of FIG. 9, the home screen 950 may include many application icons, such as application icons for all of the installed applications at the electronic device. In one or more implementations, the electronic device 102 may include a multi-page home screen with multiple pages of application icons 901 and/or user interface elements 902. However, in some operational modes of the electronic device 102 (e.g., a work mode, a home mode, a sleep mode, or a fitness mode) other than the normal operating mode, a user may benefit from viewing only a subset of the application icons 901, a subset of user interface elements 902 that are displayed in the primary home screen 950, and/or a different set of one or more user interface elements that are not included in the primary home screen 950, but are relevant to that operational mode.

For example, FIG. 10 illustrates an example of a home screen 1050 that may be displayed by the electronic device 102 when the electronic device 102 is unlocked and operating in an operational mode other than a normal operational mode of the electronic device. As shown in FIG. 10, the home screen 1050 includes a background 1000, the clock element 801, a signal strength indicator 614, a battery indicator 616, and a subset of the application icons 901 that are displayed in the primary home screen of FIG. 9. As shown in FIG. 10, the home screen 1050 for the operational mode of the electronic device 102 includes the same user interface element 902, with updating data 904, that is included in the primary home screen of FIG. 9. In other examples, the home screen 1050 may not include the user interface element 902, may include a different user interface element, and/or may include a smaller or larger version of the user interface element 902 that is displayed on the primary home screen.

As illustrated by FIG. 10, the home screen 1050 for the operational mode of the electronic device 102 includes substantially less information than is displayed on the primary home screen 950 of FIG. 9. This can be helpful to a user of the electronic device 102 if, for example, the user is at work, the electronic device 102 is operating in a work mode, and the subset of the application icons 901 and the user interface element 902 are all work related features. For example, in this illustrative example of a work mode, the application icons 901 may include an email application icon, a calendar application icon, and a work messaging application icon 901, without including other icons for other applications such as a social media application icon, a news application icon, or other application icons associated with applications that may be distracting to the user during work mode. In this example of a work mode, the user interface element 902 may be, for example, a stocks application widget that displays live stocks data that is relevant to the user's work, or may be a work messaging user interface element 902 that displays work-related messages from the user's colleagues in the updating data 904.

As discussed herein, because of the number of potential application icons, the number of potential user interface elements, the number of potential backgrounds, and/or the number of potential layouts of various home screens, the electronic device 102 may provide one or more suggested home screens for selection by a user. In this way, the electronic device 102 can facilitate a more efficient navigation of the various home screen possibilities, by providing suggested home screens that may be more relevant to the user of the electronic device 102.

Figure 11:
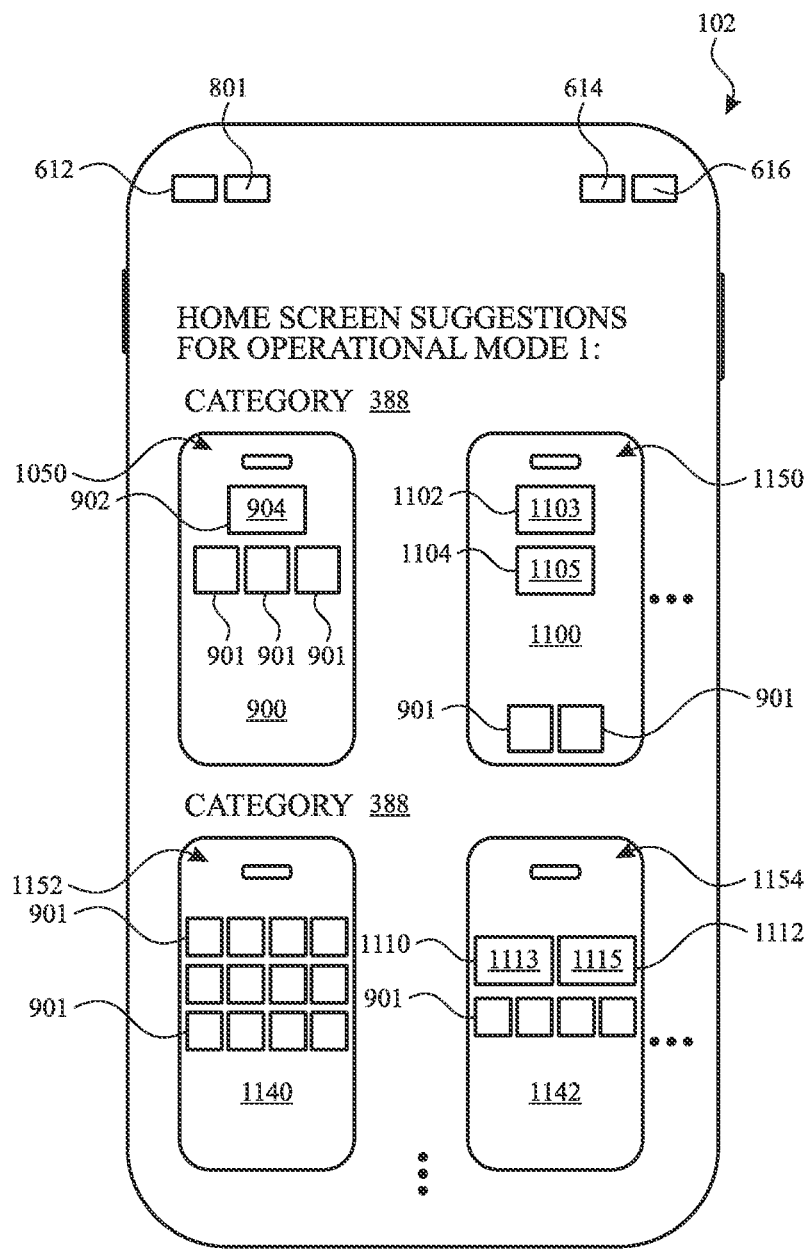
FIG. 11 illustrates an example electronic device providing suggestions of home screens for an operational mode in accordance with one or more implementations.

For example, FIG. 11 illustrates an example in which the electronic device 102 is displaying multiple home screen suggestions for a particular operational mode, such as an "operational mode 1" (e.g., operational mode 380 of FIG. 3), which may be a work mode or other operational mode as described herein. As shown in FIG. 11 the suggested home screens may include the suggested home screen 1050 of FIG. 10, a suggested home screen 1150, a suggested home screen 1152, and a suggested home screen 1154.

In the example, of FIG. 11, the suggested home screens include the home screen 1050 described above in connection with FIG. 10 and having the large user interface element 902 centered within the home screen, and including the three application icons 901 laid out in a horizontal row below the user interface element 902.

As shown, the various suggested home screens can have various different backgrounds and/or various different numbers, layouts, and/or sizes of application icons and/or user interface elements, any or all of which can be determined based on the activity history 320 and/or based on the operational mode configurations 321. In the example of FIG. 11, the suggested home screen 1150 includes a background 1100 (e.g., a different background from the background 900 of the suggested home screen 1050), two large user interface elements 1102 and 1104 laid out vertically and including respective updating data 1103 and 1105, and two application icons laid out in a horizontal row at the bottom of the home screen 1150.

As another example, the suggested home screen 1152 includes a background 1140 (e.g., a different background from the background 900 of the suggested home screen 1050 and the background 1100 of the suggested home screen 1150), twelve application icons 901, and does not include any user interface elements. As another example, the suggested home screen 1154 includes a background 1140 (e.g., a different background from the background 900 of the suggested home screen 1050, the background 1100 of the suggested home screen 1150, and the background 1142 of the suggested home screen 1154), two medium-sized user interface elements 1110 and 1112 laid out horizontally and each with corresponding updating data 1113 and 1115, and four application icons 901 laid out in a horizontal row below the two medium-sized user interface elements.

In one or more implementations, the suggested home screen 1050, the suggested home screen 1150, the suggested home screen 1152, the suggested home screen 1154 and/or one or more other suggested home screens can be generated based on the activity history 320 and the operational mode 1, and/or can be selected from a set of suggested general home screens based on the activity history 320 and the operational mode 1. For example, in one or more implementations the suggested home screen 1050, the suggested home screen 1150, the suggested home screen 1152, and the suggested home screen 1154 (e.g., including the content, color, background, layout, application icons, and/or user interface elements) thereof are each generated based on the activity history 320 and the operational mode.

In one or more other implementations, the suggested home screen 1050, the suggested home screen 1150, the suggested home screen 1152, and the suggested home screen 1154 (e.g., including the content, color, background, layout, application icons, and/or user interface elements thereof) may be generated based on global activity history for a population of users and/or devices, and may be selected (e.g., by the screen curator 351 of FIG. 3) for display as home screen suggestions for the electronic device 102. In one or more other implementations, only some of the suggested home screen 1050, the suggested home screen 1150, the suggested home screen 1152, and the suggested home screen 1154 (e.g., including the content, color, background, layout, application icons, and/or user interface elements) are generated based on the activity history 320 and the operational mode. As discussed herein, some or all of the suggested home screens may be generated by a screen generator 350 at the electronic device 102, and/or some or all of the suggested home screens may be generated remotely from the electronic device 102, such as at a server (e.g., one or more of the servers 114-118) of FIG. 1. In an example in which some or all of the suggested home screens are generated remotely from the electronic device 102, the electronic device 102 may select a subset of the suggested home screens for display and selection by a user, based on the activity history 320 and the operational mode.

In one or more implementations, generating the suggested home screen 1050, the suggested home screen 1150, the suggested home screen 1152, and the suggested home screen 1154 for the operational mode may include determining the layouts for the suggested home screen 1050, the suggested home screen 1150, the suggested home screen 1152, and the suggested home screen 1154 for the operational mode. In one or more implementations, the layouts for the suggested home screen 1050, the suggested home screen 1150, the suggested home screen 1152, and the suggested home screen 1154 for the operational mode may be determined, in part, based on the content of the respective backgrounds 900, 1100, 1140, and 1142. For example, the position, size, and/or number of UI elements and/or application icons in a suggested home screen may be determined, in part, such that certain background features (e.g., a face of a person in a photo in the background of that suggested home screen, or the eyes or mouth of an emoji of the background of that suggested home screen) are not blocked by the UI elements. In one or more implementations, multiple suggested home screens may be generated with UI elements of the same set of underlying applications but with varying sizes of the UI elements (e.g., so that the user can select a preferred layout from among multiple layouts with similar content). In one or more implementations, the layouts of the suggested home screen 1050, the suggested home screen 1150, the suggested home screen 1152, and the suggested home screen 1154 for the operational mode may be determined, in part, based on layout rules, such as rules governing even horizontal and/or vertical spacing, symmetry, minimum or maximum background coverage rules, and/or the like. For example, the application icons 901 may be laid out adjacent to and below the UI element 902 of the suggested home screen 1050 so that a feature (not shown) of the background 900 that is located below the three application icons 901 remains uncovered by the UI element 902 and the three application icons 901. As another example, the application icons 901 may be laid out at locations that are separated from the UI element 1104 of the suggested home screen 1150 so that a feature (not shown) of the background 1100 that is located above the two application icons 901 and below the UI element 1104 remains uncovered by the UI element 1104 and the two application icons 901. In one or more implementations, the layout rules may be adjusted based on the activity history 320 and/or other information, such as layouts, crowdedness, UI element sizes, etc. that are currently being used or have historically been used at the electronic device 102 and/or one or more other devices associated with a user account of the user of the electronic device 102. In one or more implementations, UI elements and/or application icons that have been identified for a suggested home screen may be ranked (e.g., ranked by relevance to the user, such as based on the activity history information) and the layout for the suggested home screen may be determined based, in part, on the ranking. For example, higher ranked application icons may be displayed higher on the display 602 than relatively lower ranked application icons (in one example).

In one or more implementations, the layout of a suggested home screen such as the suggested home screen 1150 may be determined, in part, based on associations between the UI elements and/or the application icons of the that suggested home screen. For example, the UI element 1102 and the UI element 1104 may be laid out near each other (e.g., and with a common size) based on a common or related application type for the underlying applications of the UI element 1102 and the UI element 1104, and/or the application icons 901 at the bottom of the suggested home screen 1150 may be laid out near each other based on a common or related application type for the linked applications of those application icons. In one or more implementations, the layout of a suggested home screen such as the suggested home screen 1050 may be determined, in part, based on a type of a UI element. For example, the UI element 902 may, in some examples, be a bordered UI element having a relatively large size that causes the UI element 902 to be laid out in a centered position on the suggested home screen 1050.

As shown in FIG. 11, the suggested home screens (e.g., the suggested home screen 1050, the suggested home screen 1150, the suggested home screen 1152, and the suggested home screen 1154) can be displayed in a categorized display with one, two, three, or more than three suggested home screens in each of several categories 388 of suggested home screens. As examples, the two categories 388 shown in FIG. 1 may be a photos category and a fitness category. In this illustrative example, the suggested home screen 1050 and the suggested home screen 1150 may each have a respective background 900 and 1100 that is, or includes, a photo from a photo library of a user of the electronic device, may include a color palate or scheme that is based on the colors in the respective background photos, may include a layout that facilitates viewability of faces or other objects of interest in the respective background photos, and may include application icons and/or user interface elements relating to photos in general (e.g., a photos app user interface element) and/or relating to objects and/or people the respective background photos (e.g., a messaging user interface element, a social media application, or a mapping application). To account for the operational mode, the electronic device 102 may include a subset of the application icons 901 and/or user interface elements in the suggested home screens 1050 and 1150 than would be suggested for a photos-category home screen in a primary operational mode of the electronic device 102.

In this illustrative example, the suggested home screen 1152 and the suggested home screen 1154 may each have a background that is or includes a respective fitness-related image (e.g., a photo of a user during a workout or a general photo of an athlete, athletic equipment, etc.), may include a color palate or scheme that is based on the colors in the respective background photos, may include application icons and/or user interface elements relating to fitness and/or workout tracking, and/or may include a layout that facilitates viewability of real-time fitness tracking data. To account for the operational mode, the electronic device 102 may include a subset of application icons 901 and/or user interface elements in the suggested home screens 1152 and 1154 than would be suggested for a fitness-category home screen in a primary operational mode of the electronic device 102.

Once a user selects one of the suggested home screens for the operational mode, that home screen, including the background, and any application icons and/or user interface elements associated therewith, can be displayed on the display 602 of the electronic device 102 when the electronic device 102 is unlocked and in the corresponding operational mode. In one or more implementations, various different sets and/or categories of suggested home screens may be generated and/or selected for various different respective operational modes of the electronic device 102. In one or more implementations, the suggested home screens of FIG. 11 may be provided for selection by a user during a setup operation for an operational mode of the electronic device 102. During the setup operation, the user may also set up preferences for other aspects of the device operation, such as for limiting notifications by the electronic device while the electronic device is in the operational mode.

In one or more other implementations, the suggested home screens of FIG. 11 may be provided for selection by a user in operational mode sub-sections of a suggested home screen display, so that, for example, a user can select multiple mode-specific home screens for multiple respective operational modes, from within a single interface.

In this way a user of the electronic device 102 can be provided with an efficient interface for selecting home screens (e.g., and associated content, look, layout, applications, and/or functionality) that are relevant to the user and to a particular operational mode, from many (e.g., tens, hundreds, thousands) of possible home screens available at the electronic device 102.

Figure 12:
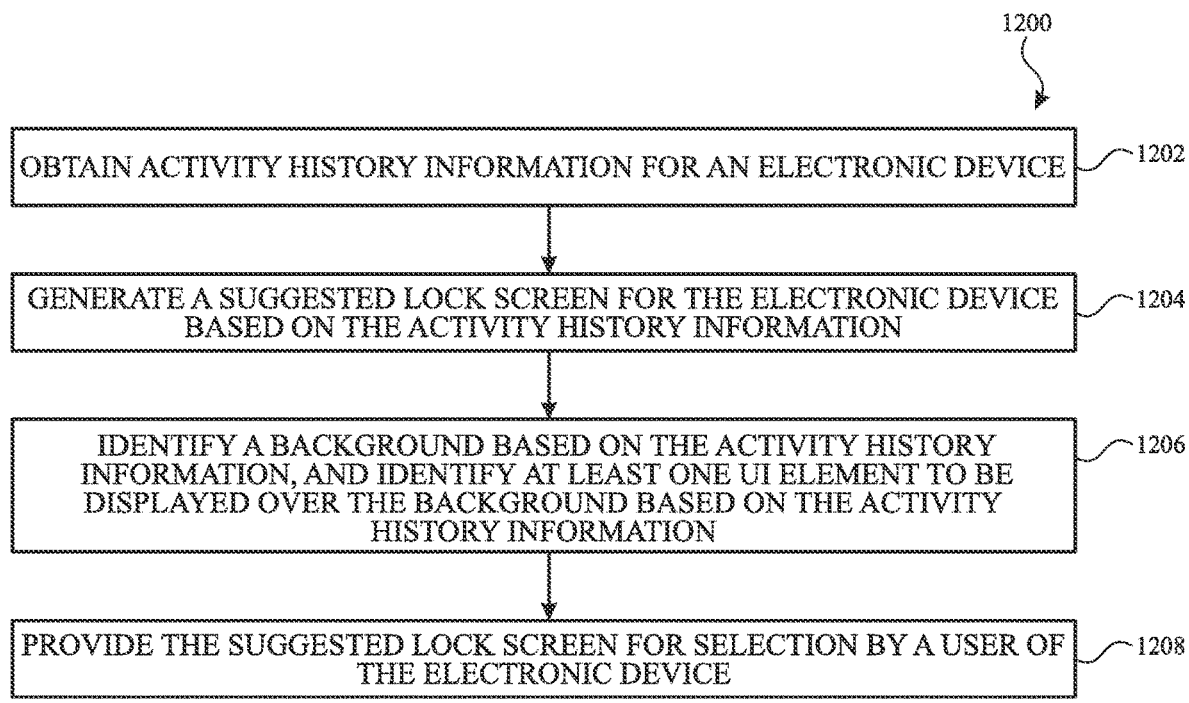
FIG. 12 illustrates an example flow diagram for a process for generating a suggested lock screen, in accordance with one or more implementations.

FIG. 12 illustrates a flow diagram of an example process 1200 for providing suggested lock screens for an electronic device, in accordance with one or more implementations. For explanatory purposes, the process 1200 is primarily described herein with reference to the electronic devices 102, 104, 106, 108 and 110 and the servers 114-118 of FIG. 1. However, the process 1200 is not limited to the electronic devices 102, 104, 106, 108 and 110 and the servers 114-118, and one or more blocks (or operations) of the process 1200 may be performed by one or more other components and/or other suitable devices. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

At block 1202, activity history information for an electronic device (e.g., electronic device 102) may be obtained. In one or more implementations, the activity history may be obtained by the electronic device, such as by a screen generator 350 of the electronic device 102, such as from storage (e.g., activity history 320 in storage 202 of FIG. 3) at the electronic device. As examples, the activity history information may include one or more of an application usage history, an emoji usage history, calendar data, social media activity of a user of the electronic device, an internet browsing history, and/or an application usage history of the electronic device. The application usage history may include, as examples, launch counts 322, launch logs 323, viewing time 324, or the like. As additional examples, the activity history information may include user-specific activity history information for a user of the electronic device and/or global activity history information for an (e.g., anonymized) population of users of electronic devices. In one or more implementations, the process 1200 may also include obtaining, by the electronic device, a location (e.g., a current location) and/or a time (e.g., a current time).

At block 1204, a suggested lock screen (e.g., suggested lock screen 750, suggested lock screen 850, suggested lock screen 852, suggested lock screen 854, or another suggested lock screen) may be generated for the electronic device based on the activity history information. Generating the suggested lock screen may include (block 1206) identifying a background (e.g., a background 402, such as the background 606, the background 806, the background 810, or the background 830) based on the activity history information, and identifying at least one user interface element (e.g., the user interface element 700, the user interface element 800, the user interface element 802, the user interface element 804, the user interface element 820, the user interface element 822, the user interface element 824, the user interface element 826, the user interface element 832, and/or the user interface element 834) to be displayed over the background based on the activity history information. In one or more implementations, the suggested lock screen may be generated by the electronic device (e.g., by the screen generator 350) at which the suggested lock screen is to be displayed. In one or more implementations, the suggested lock screen may be generated, in whole or in part, by another device or a server (e.g., one or more of the servers 114-118).

For example, in one or more implementations, generating the suggested lock screen may include generating the suggested lock screen at the electronic device. In one or more implementations, generating the suggested lock screen may include providing the activity history information to a machine learning (ML) model (e.g., implemented in the screen generator 350) at the electronic device, and identifying the at least one of the background or the at least one user interface element based on an output of the machine learning model. For example, an ML model implemented in or as the screen generator 350 may have been trained using training user activity information (e.g., and/or other training input information, such as device color information, case color information, operational mode information, etc.) from one or more (e.g., a population of) training users as training input data, and using one or more previously selected and/or previously used lock screen configurations as output training data. In one or more implementations, the ML model may output configuration information (e.g., a category 400, a background 402, a color 404, a layout 406, and/or one or more UI elements 408) from which a suggested lock screen can be rendered, and/or may output a representation (e.g., an image) of a suggested lock screen.

In one or more implementations, generating the suggested lock screen may include generating the suggested lock screen based on activity history information associated with another electronic device (e.g., another electronic device associated with a same user account as the electronic device, such as the electronic device 106 of FIG. 1). For example, if the electronic device 106 includes one or more user interface elements (e.g., user interface elements selected at the electronic device 106 by the user of the electronic device 106 and the electronic device 102), one or more of those user interface elements (and/or related backgrounds, colors, etc.) may be included in one or more of the suggested lock screens for the electronic device 102 based on the use of those one or more user interface elements at the electronic device 106. As the electronic device 102 and the electronic device 106 may have different display architectures, the layout of, and/or user interface element size(s) for, a suggested lock screen for the electronic device 102 may be modified relative to a layout for the electronic device 106, even if the elements of the lock screen are similar or the same.

In one or more implementations, the background may include a photo obtained from storage (e.g., storage 202) at the electronic device. In one or more other implementations, a photo may be identified for a background of a suggested lock screen based on the activity history information. For example, in order to generate a suggested lock screen for a photos category of suggested lock screens, the electronic device or a server may identify a photo that was recently viewed at the electronic device, a photo that is frequently viewed at the electronic device, a photo that is used as background for another screen (e.g., a home screen or a watch face) at the electronic device or another device of the user of the electronic device, and/or a photo that includes a face of a contact stored at the electronic device (e.g., a contact with which recent communications, such as phone calls or electronic messages, were exchanged, a contact with which frequent communications are exchanged, a contact marked as a favorite content, etc.) as a photo for a background of a suggested lock screen. In another example in which a photo used as a background for a suggested lock screen category other than the photos category, the photo may be classified (e.g., by a machine-learning model at the electronic device or at a server) as having a category that matches or fits within the suggested lock screen category (e.g., a photo of a cat may be classified as being suitable for a background of a suggested lock screen in a cats category of suggested lock screens, a pets category of suggested lock screens, or a wildlife category of suggested lock screens).

In one or more implementations, the background may include a full screen image of or including an emoji, a character, or the like. In one or more other implementations, an emoji or a character may be identified for a background of a suggested lock screen based on the activity history information. For example, in order to generate a suggested lock screen for an emojis category of suggested lock screens, the electronic device or a server may identify an emoji that was recently selected or viewed at the electronic device, an emoji that is frequently selected or viewed at the electronic device, an emoji that is used as background for another screen (e.g., a home screen or a watch face) at the electronic device or another device of the user of the electronic device, or an emoji having an associated emotion identifier that corresponds to a determined user emotion (e.g., using sensor data obtained by the electronic device), for a background of a suggested lock screen.

In one or more implementations, the background may include a full screen background of a single color, multiple colors, or a patterned background of various colors. In one or more implementations, generating the suggested lock screen may also include identifying a color based on the activity history information, and/or identifying a layout based on the activity history information. The identified color may be used as a color of some or all of the background for the suggested lock screen, and/or a color for one or more elements of the suggested lock screen. In one or more implementations, the identified color may be used to select a photo for the background for the suggested lock screen. For example, the identified color may be used to identify a photo that includes that color and/or one or more colors that are complementary to that color.

In one or more implementations, identifying the color to be used for the suggested lock screen may include identifying the color based on the color of a mechanical component of the electronic device or a color included in data stored and/or accessed by the electronic device, such a color in a photo associated with the electronic device. For example, when the color for the suggested lock screen is identified using a photo, the color may be the same as, or complementary to, a color that is prominently included (e.g., covers more than fifty percent of the photo, or covers a larger percentage of the photo than any other color in the photo) in the photo. In another example, the color to be used for the suggested lock screen may be the same as, or complementary to, a color associated with a home screen or other screen of the electronic device and/or another electronic device (e.g., a color of a watch face of a smart watch associated with the electronic device).

In one or more implementations, identifying the color to be used for the suggested lock screen may include identifying the color based on an exterior color of a mechanical component (e.g., the housing 600 or a cover or case of the electronic device 102) of the electronic device. For example, in one or more implementations, the electronic device 102 may determine a color of a case that has been attached to the electronic device 102. As examples, the electronic device 102 may determine the color of the case by detecting the color using one or more cameras of the electronic device, by receiving an indication of the color from communications circuitry of the case (e.g., in a scenario in which the case is a smart case capable of communicating color information), and/or the color of the case may be obtained based on a user input to the electronic device 102 indicating the color of the case. In this example, the color to be used for the suggested lock screen may include the identified color of the case and/or one or more colors that are complementary to the color of the case. In one or more other implementations, the color to be used for the suggested lock screen may include a color of the housing 600 and/or one or more colors that are complementary to the color of the housing 600.

In one or more implementations, generating the suggested lock screen may also include identifying a category for the suggested lock screen based on the activity history information, and/or identifying the at least one user interface element based on the activity history information and the category. As examples, the category of the suggested lock screen may be a photos category, an emojis category, a fitness category, an application-specific category, a weather category, a space category, a calendar category, a news category or any other category that defines the overall theme of the suggested lock screen. For example, for a weather category suggested lock screen, the suggested lock screen may include weather-related user interface elements such as one or more weather widgets, a snow report widget, a surf report widget, a road conditions widget, or other weather-related widgets and/or complications. In one or more implementations, the categories of the suggested lock screens may be used to group the suggested lock screens for presentation to a user.

In one or more implementations, generating the suggested lock screen may include generating the suggested lock screen based on the activity history information, and the location and the time. For example, if the electronic device is determined to be at a location associated with an event (e.g., a festival, a conference, a sporting event, a concert, or other event), within a threshold amount of time leading up to the event (e.g., within the week leading up to the event or within a day of the event), one or more event-related suggested lock screens (e.g., including a background image and/or text associated with the event, and/or one or more user interface elements for an application associated with the event) may be generated for the electronic device.

At block 1208, the suggested lock screen may be provided for selection by a user of the electronic device. For example, providing the suggested lock screen for selection may include displaying the suggested lock screen with a display of the electronic device (e.g., as described herein in connection with, for example, FIG. 8). In an implementation in which a suggested lock screen is generated remotely from an electronic device for which the suggested lock screen is intended to be displayed, the suggested lock screen may be provided to the electronic device (e.g., from a remote device or server that generated the suggested lock screen), for curation, modification, and/or display at the electronic device.

In one or more implementations, the process 1200 may also include receiving a selection of the suggested lock screen for the electronic device (e.g., from a user, such as by the user touching a location on the display of the electronic device at which the suggested lock screen is displayed, or receiving the selection from the user via another user interface of the electronic device). The electronic device may then display the background and the at least one user interface element when the suggested lock screen for the electronic device is displayed (e.g., as discussed herein in connection with FIG. 7). For example, once selected by the user, the suggested lock screen may be displayed while the electronic device is locked (e.g., following a locking event in which the contents of the electronic device are encrypted and/or otherwise prevented from being accessed without authorization by the user of the device). In one or more implementations, once selected by the user, the suggested lock screen may continue to be displayed after the electronic device is unlocked and prior to receiving a user indication to navigate from the suggested lock screen to another screen of the electronic device. For example, the electronic device may be unlocked responsive to receiving authentication information (e.g., a passcode or biometric authentication information, such as a fingerprint or facial identification information for an authorized user of the electronic device).

In one or more implementations, providing the suggested lock screen for selection by a user of the electronic device may include receiving the suggested lock screen and additional suggested lock screens at a selector (e.g., screen curator 351) at the electronic device, and selecting, by the selector and based on the activity history information, the suggested lock screen from among the suggested lock screen and the plurality of additional suggested lock screens.

In one or more implementations, the suggested lock screen may be a suggested lock screen for an operational mode associated with the electronic device (e.g., operational mode 380 or operational mode 1, or operational mode 380, as described herein), and generating the suggested lock screen may include identifying the at least one user interface element to be displayed over the background based on the activity history information and mode information (e.g., operational mode configurations 321) associated with the operational mode. For example, the operational mode may be a work mode, and the at least one user interface element may be a calendar widget, an email widget, or a stock widget (as examples). As another example, the operational mode may be a fitness mode or a workout mode, and the at least one user interface element may include a fitness tracking widget, a weather widget, and/or a music player widget.

Figure 13:
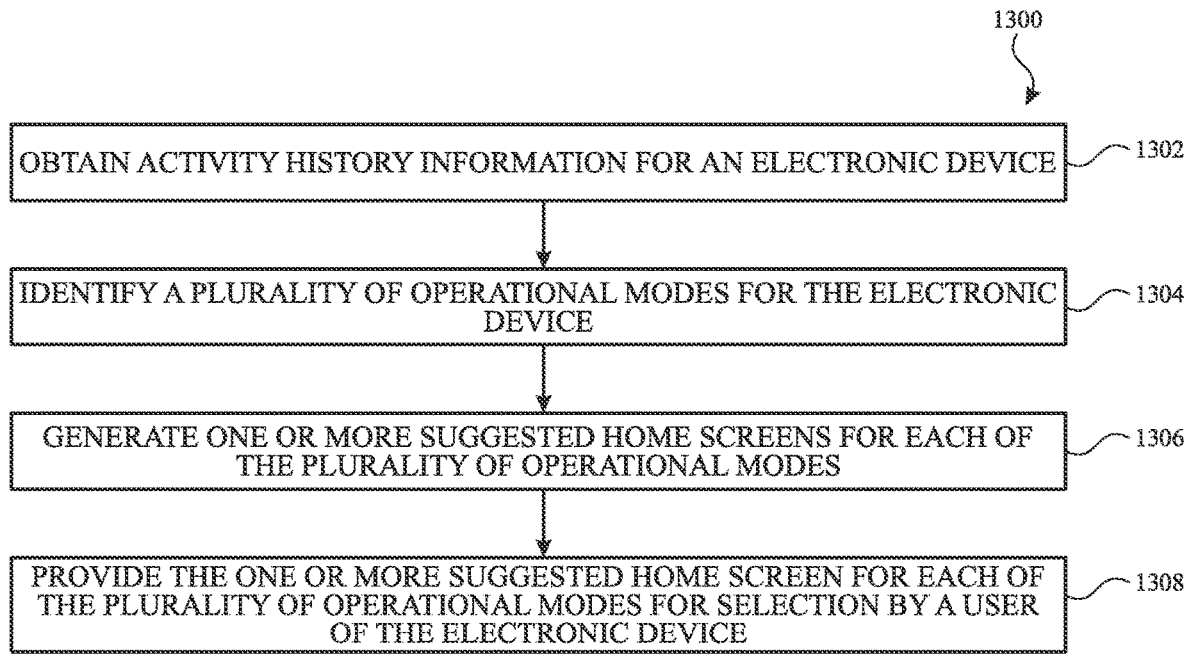
FIG. 13 illustrates an example flow diagram for a process for providing suggested home screens for various operational modes of an electronic device, in accordance with one or more implementations.

FIG. 13 illustrates a flow diagram of an example process 1300 for providing a suggested home screen for an operational mode of an electronic device, in accordance with one or more implementations. For explanatory purposes, the process 1300 is primarily described herein with reference to the electronic devices 102, 104, 106, 108 and 110 and the servers 114-118 of FIG. 1. However, the process 1300 is not limited to the electronic devices 102, 104, 106, 108 and 110 and the servers 114-118, and one or more blocks (or operations) of the process 1300 may be performed by one or more other components and/or other suitable devices. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

At block 1302, activity history information for an electronic device (e.g., electronic device 102) may be obtained. In one or more implementations, the activity history may be obtained by the electronic device, such as by a screen generator 350 of the electronic device 102, such as from storage (e.g., activity history 320 in storage 202) at the electronic device. As examples, the activity history information may include one or more of an application usage history, an emoji usage history, calendar data, social media activity of a user of the electronic device, and an internet browsing history of the electronic device. As additional examples, the activity history information may include user-specific activity history information for a user of the electronic device and global activity history information for an anonymized population of users of electronic devices. In one or more implementations, the process 1200 may also include obtaining, by the electronic device, a location (e.g., a current location) and/or a time (e.g., a current time). In one or more implementations, the activity history information may include information associated with another electronic device (e.g., the electronic device 106).

At block 1304, a plurality of operational modes (e.g., operational mode configurations 321, such as for an operational mode 380) for the electronic device may be identified (e.g., by the electronic device or by a remote device or server). As examples, the plurality of operational modes may include a work mode, a home mode, a fitness mode or workout mode, a sleep mode, or the like.

At block 1306, one or more suggested home screens (e.g., the home screen 1050, the home screen 1150, the home screen 1152, and/or the home screen 1154) may be generated (e.g., by the electronic device or a remote device or server) for each of the plurality of operational modes. For example, the electronic device may include one or more primary home screens (e.g., home screen 950) configured to be displayed when the electronic device is not operating in any of the plurality of operational modes (e.g., when the electronic device is operating in the primary mode 382, also referred to herein as a normal operating mode). The primary home screen may include a plurality of application icons (e.g., application icons 901, such as application icons for all of the installed applications at the electronic device), and each of the one or more suggested home screens for each of the plurality of operational modes may include a subset of the plurality of application icons. For example, the primary home screen may include a first set of user interface elements (e.g., the user interface element 902 and/or one or more other user interface elements), and at least one of the one or more suggested home screens for at least one of the operational modes may include a second set of user interface elements different from the first set of user interface elements (e.g., no user interface elements, the user interface element 1102, the user interface element 1104, the user interface element 1110, and/or the user interface element 1112). The second set of user interface elements different from the first set of user interface elements may be a subset of the first set of user interface elements and/or may include user interface elements that are not included in the first set of user interface elements.

In one or more implementations, each of the suggested home screens may include, based on the activity history information and/or information associated with an operational mode, a suggested layout, a suggested full screen background (e.g., the background 900, the background 1100, the background 1140, and/or the background 1142), and one or more suggested user interface elements.

In one or more implementations, the suggested full screen background for a suggested home screen may include a photo obtained from storage (e.g., storage 202) at the electronic device. In one or more other implementations, a photo may be identified for a suggested full screen background of a suggested home screen based on the activity history information and the operational mode information. For example, in order to generate a suggested home screen for a photos category of suggested home screens for an operational mode, the electronic device or a server (e.g., an ML model trained to identify photos based on activity history information and operational mode information) may identify a photo that is related to the operational mode and that was recently viewed at the electronic device, a photo that is related to the operational mode and frequently viewed at the electronic device, a photo that is related to the operational mode and used as background for another screen (e.g., a home screen or a watch face) at the electronic device or another device of the user of the electronic device, and/or a photo that is related to the operational mode and includes a face of a contact stored at the electronic device (e.g., a contact with which recent communications, such as phone calls or electronic messages, were exchanged, a contact with which frequent communications are exchanged, a contact marked as a favorite content, etc.) as a photo for a full screen background of a suggested home screen.

In another example in which a photo used as a full screen background for a suggested home screen category other than the photos category, the photo may be classified (e.g., by a machine-learning model at the electronic device or at a server) as having being related to the operational mode and as having a category that matches or fits within the suggested home screen category (e.g., a tranquil photo of a lake may be classified as being suitable for a background of a suggested home screen in a weather category of suggested home screens for a work mode, or a photo of a storm with lightning may be classified as being suitable for a background of a suggested home screen in a weather category of suggested home screens for a workout mode).

In one or more implementations, the full screen background for a suggested home screen for an operational mode may include a full screen image of or including an emoji, a character, or the like. In one or more other implementations, an emoji or a character may be identified for a full screen background of a suggested home screen based on the activity history information. For example, in order to generate a suggested home screen for an emojis category of suggested home screens for an operational mode, the electronic device or a server may identify an emoji that relates to the operational mode and that was recently selected or viewed at the electronic device, an emoji that relates to the operational mode and that is frequently selected or viewed at the electronic device, an emoji that relates to the operational mode and that is used as background for another screen (e.g., a home screen or a watch face) at the electronic device or another device of the user of the electronic device, or an emoji that relates to the operational mode and having an associated emotion identifier (e.g., peaceful, sleepy, tired, excited, energetic, etc.) that corresponds to a determined user emotion, for a background of a suggested home screen.

In one or more implementations, the background for a suggested home screen for an operational mode may include a full screen background of a single color, multiple colors, or a patterned background of various colors. In one or more implementations, generating a suggested home screen may also include identifying a color based on the activity history information, and/or identifying a layout based on the activity history information. The identified color may be used as a color of some or all of the background for the suggested home screen, and/or a color for one or more elements of the suggested home screen. In one or more implementations, the color may be used to select a photo for the background for the suggested home screen. For example, the identified color may be used to identify a photo that includes that color and/or one or more colors that are complementary to that color.

In one or more implementations, identifying the color to be used for the suggested home screen for an operational mode may include identifying the color based on the color of a mechanical component of the electronic device or data stored and/or accessed by the electronic device, such a color in a photo associated with the electronic device. For example, when the color for the suggested home screen is identified using a photo, the color may be the same as, or complementary to, a color that is prominently included (e.g., covers more than fifty percent of the photo, or covers a larger percentage of the photo than any other color in the photo). In another example, the color to be used for the suggested home screen may be the same as, or complementary to, a color associated with a lock screen or other screen of the electronic device and/or another electronic device (e.g., a color of a watch face of a smart watch associated with the electronic device).

In one or more implementations, identifying the color to be used for the suggested home screen for an operational mode may include identifying the color based on an exterior color of a mechanical component (e.g., the housing 600 or a cover or case of the electronic device 102) of the electronic device. For example, in one or more implementations, the electronic device 102 may determine a color of a case that has been attached to the electronic device 102. As examples, the electronic device 102 may determine the color of the case by detecting the color using one or more cameras of the electronic device, by receiving an indication of the color from communications circuitry of the case (e.g., in a scenario in which the case is a smart case capable of communicating color information), and/or the color of the case may be obtained based on a user input to the electronic device 102 indicating the color of the case. In this example, the color to be used for the suggested home screen for an operational mode may include the identified color of the case and/or one or more colors that are complementary to the color of the case. In one or more other implementations, the color to be used for the suggested lock screen may include a color of the housing 600 and/or one or more colors that are complementary to the color of the housing 600.

In one or more implementations, generating the one or more suggested home screens for each of the plurality of operational modes may include generating multiple suggested home screens for each of the plurality of operational modes and selecting (e.g., by the screen curator 351) a subset of the multiple suggested home screens to be provided to the user based on the activity history information.

At block 1308, the one or more suggested home screens for each of the plurality of operational modes may be provided for selection by a user of the electronic device. For example, providing the one or more suggested home screens for selection may include providing the one or more suggested home screens for display (e.g., as discussed herein in connection with FIG. 11). For example, in one or more implementations, the one or more suggested home screens may be grouped into categories for display and selection by the user.

In one or more implementations, one or more suggested lock screens may also be generated for each of the plurality of operational modes, and the one or more suggested lock screens for each of the plurality of operational modes may be provided (e.g., displayed) for selection by the user (e.g., as discussed herein in connection with FIG. 8).

In one or more implementations, generating the suggested home screen(s) may include providing the activity history information and operational mode configuration information to a machine learning model (e.g., implemented in the screen generator 350) at the electronic device, and identifying the at least one of the background, the one or more application icons, a layout, and/or the at least one user interface element based on an output of the machine learning model. For example, an ML model implemented in or as the screen generator 350 may have been trained using training user activity information and training operational mode configuration information (e.g., and/or other information, such as device color information, case color information, etc.) from one or more (e.g., a population of) training users as training input data, and using one or more previously selected and/or used home screen configurations as output training data. In one or more implementations, the ML model may output configuration information (e.g., a category 400, a background 402, a color 404, a layout 406, application identifiers and/or associated application icons 410, and/or one or more UI elements 408) from which a suggested home screen can be rendered, and/or may output a representation (e.g., an image) of a suggested home screen.

Figure 14:
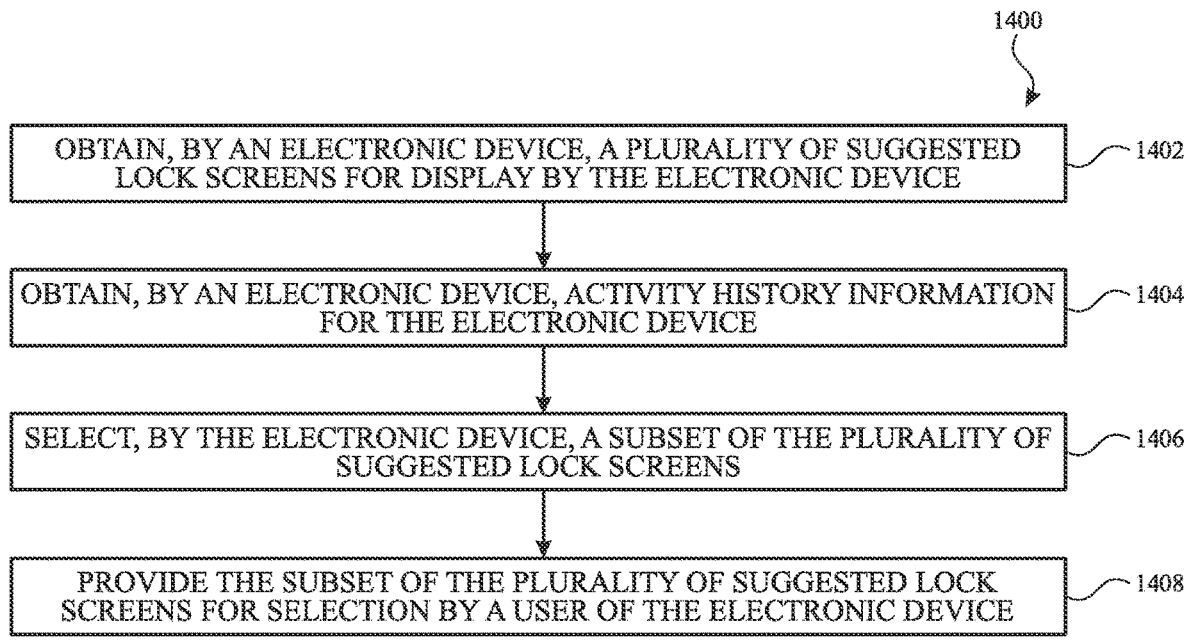
FIG. 14 illustrates an example flow diagram for a process for providing suggested lock screens, in accordance with one or more implementations.

FIG. 14 illustrates a flow diagram of an example process 1400 for providing suggested lock screens for an electronic device, in accordance with one or more implementations. For explanatory purposes, the process 1400 is primarily described herein with reference to the electronic devices 102, 104, 106, 108 and 110 and the servers 114-118 of FIG. 1. However, the process 1400 is not limited to the electronic devices 102, 104, 106, 108 and 110 and the servers 114-118, and one or more blocks (or operations) of the process 1400 may be performed by one or more other components and/or other suitable devices. Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

At block 1402, an electronic device (e.g., electronic device 102) may obtain a plurality of suggested lock screens for display by the electronic device. For example, each of the plurality of suggested lock screens may include (e.g., based on the activity history information) a suggested layout (e.g., a layout 406), a suggested background (e.g., a background 402), and one or more suggested user interface elements (e.g., one or more user interface elements 408). In one or more implementations, the plurality of suggested lock screens may have been generated at the electronic device (e.g., by screen generator 350). For example, obtaining the plurality of suggested lock screens may include generating at least one of the plurality of suggested lock screens at the electronic device. In one or more other implementations, the plurality of suggested lock screens may have been generated by a remote device or server (e.g., one or more of servers 114-118) and transmitted to the electronic device. For example, obtaining the plurality of suggested lock screens may include receiving the plurality of suggested lock screens at the electronic device from a server.

At block 1404, the electronic device may obtain activity history information (e.g., activity history 320) for the electronic device. In one or more implementations, the activity history information may be obtained by the electronic device, such as by a screen generator 350 of the electronic device 102, such as from storage (e.g., storage 202) at the electronic device. As examples, the activity history information may include one or more of an application usage history, an emoji usage history, calendar data, social media activity of a user of the electronic device, and an internet browsing history of the electronic device. As additional examples, the activity history information may include user-specific activity history information for a user of the electronic device and global activity history information for an anonymized population of users of electronic devices. In one or more implementations, the process 1200 may also include obtaining, by the electronic device, a location (e.g., a current location) and/or a time (e.g., a current time). In one or more implementations, the activity history information may include information from another electronic device (e.g., the electronic device 106).

At block 1406, the electronic device may select a subset (e.g., the suggested lock screen 750, the suggested lock screen 850, the suggested lock screen 852, and/or the suggested lock screen 854 as in the example of FIG. 8) of the plurality of suggested lock screens. In one or more implementations, selecting the subset may include selecting, based on the activity history information, a subset of the suggested lock screens that include content (e.g., UI elements and/or background content) determined to be relevant to the user of the electronic device). For example, selecting the subset of the plurality of suggested lock screens may include selecting the subset of the plurality of suggested lock screens based on the activity history information and/or a location of the electronic device. For example, selecting the subset of the plurality of suggested lock screens based on the activity history information and/or the location of the electronic device may include selecting one or more suggested lock screens that include content (e.g., UI elements and/or background content) that is relevant to the activity history and/or the location (e.g., UI elements and/or background content that are relevant to an event at or near the location and associated with information in the activity history information). In one or more implementations, selecting the subset of the plurality of suggested lock screens may include selecting the subset of the plurality of suggested lock screens based on the activity history information and a current time. For example, selecting the subset of the plurality of suggested lock screens based on the activity history information and/or the current time may include selecting one or more suggested lock screens that include content (e.g., UI elements and/or background content) that is relevant to the activity history and/or the current time (e.g., UI elements and/or background content that are relevant to an event at or near the current time and associated with information in the activity history information).

In one or more implementations, selecting the subset of the plurality of suggested lock screens may include modifying a previously displayed subset of the plurality of suggested lock screens. For example, modifying the previously displayed subset of the plurality of suggested lock screens may include shuffling a display order of at least some of the previously displayed subset of the plurality of suggested lock screens. As another example, modifying the previously displayed subset of the plurality of suggested lock screens may include replacing an unselected one of the previously displayed subset of the plurality of suggested lock screens with another of the plurality of suggested lock screens. In this way, the suggested lock screens can be curated (e.g., by screen curator 351) to remove and/or deemphasize one or more suggested lock screens for which the user has already indicated a lack of interest (e.g., by previously viewing and not selecting).

In one or more implementations, selecting the subset of the plurality of suggested lock screens may include selecting a first subset of the plurality of suggested lock screens for a first operational mode of the electronic device and a second subset of the plurality of suggested lock screens for a second operational mode of the electronic device. For example, the first operational mode may be a workout mode and the first subset of the plurality of suggested lock screens may be a set of suggested lock screens that each include a fitness-related background and/or one or more fitness-related user interface elements. For example, the second operational mode may be a work mode and the second subset of the plurality of suggested lock screens may be a set of suggested lock screens that each include a work-related background and/or one or more work-related user interface elements.

At block 1408, the electronic device may provide the subset of the plurality of suggested lock screens for selection by a user of the electronic device. For example, providing the one or more suggested lock screens for selection may include providing the one or more suggested lock screens for display (e.g., as discussed herein in connection with FIG. 8).

As described above, one aspect of the present technology is the gathering and use of data available from specific and legitimate sources for providing suggested home screens and/or lock screens. The present disclosure contemplates that in some instances, this gathered data may include personal information data that uniquely identifies or can be used to identify a specific person. Such personal information data can include demographic data, location-based data, online identifiers, telephone numbers, activity history information, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing suggested home screens and/or lock screens. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing suggested home screens and/or lock screens, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 15:
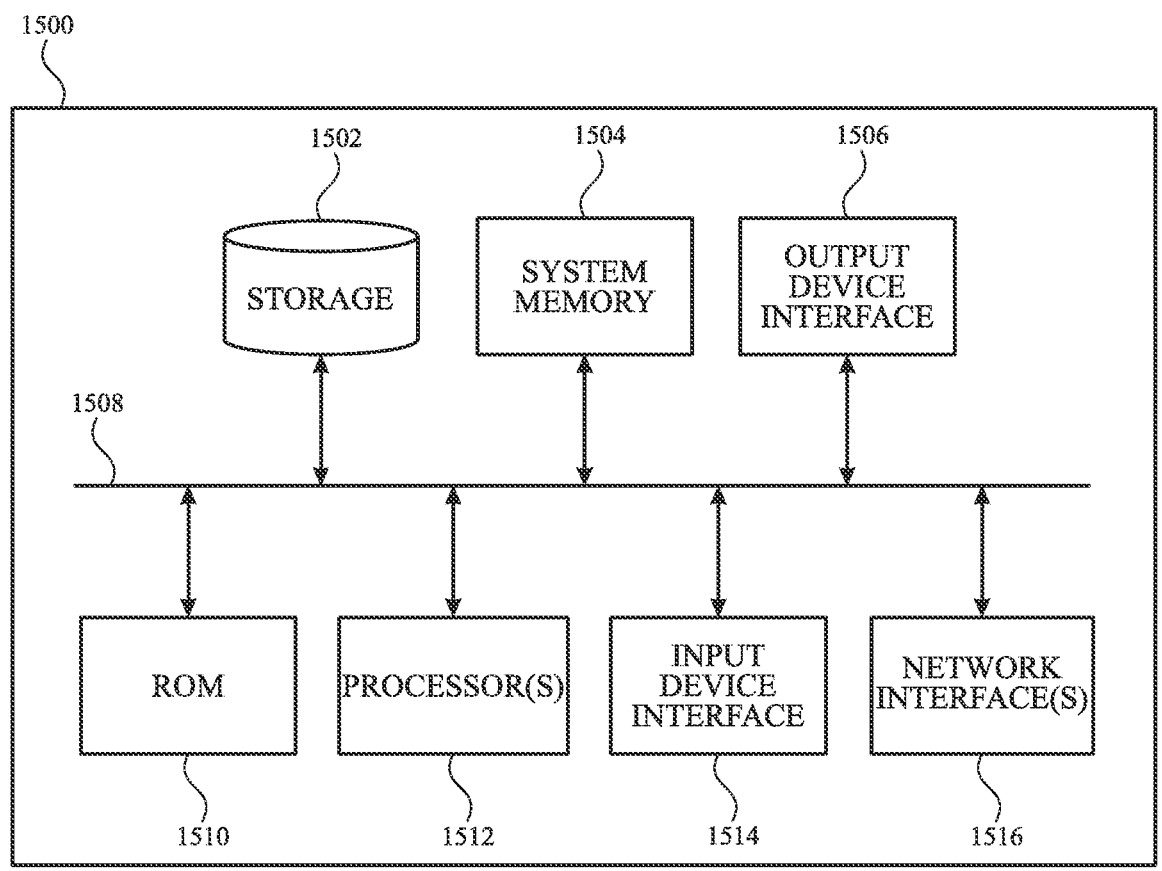
FIG. 15 illustrates an example electronic system with which aspects of the subject technology may be implemented in accordance with one or more implementations.

FIG. 15 illustrates an electronic system 1500 with which one or more implementations of the subject technology may be implemented. The electronic system 1500 can be, and/or can be a part of, one or more of the electronic devices 102-110, and/or one or the servers 114-118 shown in FIG. 1. The electronic system 1500 may include various types of computer readable media and interfaces for various other types of computer readable media. The electronic system 1500 includes a bus 1508, one or more processing unit(s) 1512, a system memory 1504 (and/or buffer), a ROM 1510, a permanent storage device 1502, an input device interface 1514, an output device interface 1506, and one or more network interfaces 1516, or subsets and variations thereof.

The bus 1508 collectively represents all system, peripheral, and chipset buses that communicatively connect the numerous internal devices of the electronic system 1500. In one or more implementations, the bus 1508 communicatively connects the one or more processing unit(s) 1512 with the ROM 1510, the system memory 1504, and the permanent storage device 1502. From these various memory units, the one or more processing unit(s) 1512 retrieves instructions to execute and data to process in order to execute the processes of the subject disclosure. The one or more processing unit(s) 1512 can be a single processor or a multi-core processor in different implementations.

The ROM 1510 stores static data and instructions that are needed by the one or more processing unit(s) 1512 and other modules of the electronic system 1500. The permanent storage device 1502, on the other hand, may be a read-and-write memory device. The permanent storage device 1502 may be a non-volatile memory unit that stores instructions and data even when the electronic system 1500 is off. In one or more implementations, a mass-storage device (such as a magnetic or optical disk and its corresponding disk drive) may be used as the permanent storage device 1502.

In one or more implementations, a removable storage device (such as a floppy disk, flash drive, and its corresponding disk drive) may be used as the permanent storage device 1502. Like the permanent storage device 1502, the system memory 1504 may be a read-and-write memory device. However, unlike the permanent storage device 1502, the system memory 1504 may be a volatile read-and-write memory, such as random access memory. The system memory 1504 may store any of the instructions and data that one or more processing unit(s) 1512 may need at runtime. In one or more implementations, the processes of the subject disclosure are stored in the system memory 1504, the permanent storage device 1502, and/or the ROM 1510. From these various memory units, the one or more processing unit(s) 1512 retrieves instructions to execute and data to process in order to execute the processes of one or more implementations.

The bus 1508 also connects to the input and output device interfaces 1514 and 1506. The input device interface 1514 enables a user to communicate information and select commands to the electronic system 1500. Input devices that may be used with the input device interface 1514 may include, for example, alphanumeric keyboards and pointing devices (also called "cursor control devices"). The output device interface 1506 may enable, for example, the display of images generated by electronic system 1500. Output devices that may be used with the output device interface 1506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 15, the bus 1508 also couples the electronic system 1500 to one or more networks and/or to one or more network nodes, such as one or more of the servers 114-118 shown in FIG. 1, through the one or more network interface(s) 1516. In this manner, the electronic system 1500 can be a part of a network of computers (such as a LAN, a wide area network ("WAN"), or an Intranet, or a network of networks, such as the Internet. Any or all components of the electronic system 1500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining activity history information for an electronic device;
    generating a suggested lock screen for the electronic device based on the activity history information by:
        identifying a background based on the activity history information, and
        identifying at least one user interface element to be displayed over the background based on the activity history information;
    providing the suggested lock screen for selection by a user of the electronic device;
    receiving a selection of the suggested lock screen for the electronic device; and
    displaying the background and the at least one user interface element when the suggested lock screen for the electronic device is displayed, wherein, once selected by the user, the suggested lock screen is displayed while the electronic device is locked and continues to be displayed after the electronic device is unlocked and prior to receiving a user indication to navigate from the suggested lock screen to another screen of the electronic device.

2. The method of claim 1, wherein generating the suggested lock screen further comprises:
    identifying a color based on the activity history information, and
    identifying a layout based on the activity history information.

3. The method of claim 2, wherein identifying the color comprises identifying the color based on a photo associated with the electronic device.

4. The method of claim 2, wherein identifying the color comprises identifying the color based on an exterior color of a mechanical component of the electronic device.

5. The method of claim 1, wherein generating the suggested lock screen further comprises:
    identifying a category for the suggested lock screen based on the activity history information, and
    identifying the at least one user interface element based on the activity history information and the category.

6. The method of claim 1, further comprising:
    obtaining, by the electronic device, a location and a time; and
    generating the suggested lock screen based on the activity history information, the location, and the time.

7. The method of claim 1, wherein the activity history information includes user-specific activity history information for a user of the electronic device and global activity history information for an anonymized population of users of electronic devices.

8. The method of claim 1, wherein providing the suggested lock screen for selection by a user of the electronic device comprises:
    receiving the suggested lock screen and a plurality of additional suggested lock screens at a selector at the electronic device; and
    selecting, by the selector and based on the activity history information, the suggested lock screen from among the suggested lock screen and the plurality of additional suggested lock screens.

9. The method of claim 1, wherein the suggested lock screen is a suggested lock screen for an operational mode associated with the electronic device, wherein the operational mode is a configuration of the electronic device, and wherein generating the suggested lock screen comprises identifying at least one user interface element to be displayed over the background based on the activity history information and mode information associated with the operational mode.

10. The method of claim 1, wherein generating the suggested lock screen comprises:
    generating the suggested lock screen at the electronic device by:
        providing the activity history information to a machine learning engine at the electronic device; and
        identifying the at least one of the background or the at least one user interface element based on an output of the machine learning engine.

11. The method of claim 10, wherein the suggested lock screen includes a background photo and the output of the machine learning engine provides the background photo, wherein the background photo is clear, in focus, and/or has regions of blank or smoothly changing content.

12. The method of claim 1, wherein the background comprises a photo, and wherein the activity history information includes one or more of an application usage history, an emoji usage history, calendar data, social media activity of a user of the electronic device, and an internet browsing history of the electronic device.

13. The method of claim 12, wherein the application usage history comprises one or more of launch counts, launch logs, or viewing time.

14. A method, comprising:
obtaining activity history information for an electronic device;
identifying a plurality of operational modes for the electronic device;
generating one or more suggested home screens for each of the plurality of operational modes;
providing the one or more suggested home screens for each of the plurality of operational modes for selection by a user of the electronic device;
generating one or more suggested lock screens for each of the plurality of operational modes;
providing the one or more suggested lock screens for each of the plurality of operational modes for selection by the user;
receiving a selection of a lock screen from the one or more suggested lock screens; and
displaying the selected lock screen, wherein the selected lock screen continues to be displayed after the electronic device is unlocked and prior to receiving a user indication to navigate from the selected lock screen to another screen of the electronic device.

15. The method of claim 14, wherein the electronic device comprises a primary home screen configured to be displayed the electronic device is not operating in any of the plurality of operational modes, wherein the primary home screen includes a plurality of application icons, and wherein each of the one or more suggested home screens for each of the plurality of operational modes comprises a subset of the plurality of application icons.

16. The method of claim 15, wherein the primary home screen comprises a first plurality of user interface elements, and wherein at least one of the one or more suggested home screens for at least one of the operational modes includes a second plurality of user interface elements different from the first plurality of user interface elements.

17. The method of claim 14, wherein each of the suggested home screens comprises, based on the activity history information:
a suggested layout; and
one or more suggested user interface elements.

18. The method of claim 14, wherein generating the one or more suggested home screens for each of the plurality of operational modes comprises generating multiple suggested home screens for each of the plurality of operational modes selecting a subset of the multiple suggested home screens to be provided to the user based on the activity history information.

19. The method of claim 14, wherein generating the one or more suggested lock screens comprises:
generating the suggested lock screens at the electronic device by:
providing the activity history information to a machine learning engine at the electronic device; and
identifying at least one background image or at least one user interface element based on an output of the machine learning engine.

20. The method of claim 19, wherein the suggested lock screen includes a background photo and the output of the machine learning engine provides the background photo, wherein the background photo is clear, in focus, and/or has regions of blank or smoothly changing content.

21. A method, comprising:
obtaining, by an electronic device, a plurality of suggested lock screens for display by the electronic device;
obtaining, by an electronic device, activity history information for the electronic device;
selecting, by the electronic device, a subset of the plurality of suggested lock screens;
providing the subset of the plurality of suggested lock screens for selection by a user of the electronic device;
receiving a selection of a lock screen from the subset of the plurality of suggested lock screens; and
displaying the selected lock screen, wherein the selected lock screen continues to be displayed after the electronic device is unlocked and prior to receiving a user indication to navigate from the selected lock screen to another screen of the electronic device.

22. The method of claim 21, wherein each of the plurality of suggested lock screens comprises, based on the activity history information:
a suggested layout;
a suggested background; and
one or more suggested user interface elements.

23. The method of claim 21, wherein selecting the subset of the plurality of suggested lock screens comprises selecting the subset of the plurality of suggested lock screens based on the activity history information and a location of the electronic device or based on the activity history information and a current time.

24. The method of claim 21, wherein selecting the subset of the plurality of suggested lock screens comprises modifying a previously displayed subset of the plurality of suggested lock screens.

25. The method of claim 24, wherein modifying the previously displayed subset of the plurality of suggested lock screens comprises shuffling a display order of at least some of the previously displayed subset of the plurality of suggested lock screens.

26. The method of claim 24, wherein modifying the previously displayed subset of the plurality of suggested lock screens comprises replacing an unselected one of the previously displayed subset of the plurality of suggested lock screens with another of the plurality of suggested lock screens.

27. The method of claim 21, wherein obtaining the plurality of suggested lock screens comprises receiving the plurality of suggested lock screens at the electronic device from a server.

28. The method of claim 21, wherein obtaining the plurality of suggested lock screens comprises generating at least one of the plurality of suggested lock screens at the electronic device.

29. The method of claim 21, wherein selecting the subset of the plurality of suggested lock screens comprises selecting a first subset of the plurality of suggested lock screens for a first operational mode of the electronic device and a second subset of the plurality of suggested lock screens for a second operational mode of the electronic device, wherein the first operational mode and the second operational mode are each a configuration of the electronic device.

30. The method of claim 21, wherein the activity history information comprises application usage history including one or more of launch counts, launch logs, or viewing time.

* * * * *